US012368495B2

(12) United States Patent
Amiri et al.

(10) Patent No.: US 12,368,495 B2
(45) Date of Patent: Jul. 22, 2025

(54) MULTIPATH ANGLE ESTIMATION AND REPORTING FOR NR POSITIONING

(71) Applicant: QUALCOMM Incorporated, San Diego, CA (US)

(72) Inventors: Roohollah Amiri, San Diego, CA (US); Marwen Zorgui, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 18/543,917

(22) Filed: Dec. 18, 2023

(65) Prior Publication Data

US 2025/0202571 A1 Jun. 19, 2025

(51) Int. Cl.
*H04B 7/08* (2006.01)
*H04B 7/04* (2017.01)

(52) U.S. Cl.
CPC ....... *H04B 7/0897* (2013.01); *H04B 7/04013* (2023.05)

(58) Field of Classification Search
CPC ................ H04B 7/0897; H04B 7/04013
See application file for complete search history.

(56) References Cited

U.S. PATENT DOCUMENTS

2016/0266232 A1\* 9/2016 Chen ................... G01S 5/02526
2019/0039570 A1\* 2/2019 Foster ................ G07C 9/00309
2021/0344384 A1\* 11/2021 Dunna ..................... H01Q 3/32

FOREIGN PATENT DOCUMENTS

WO 2022152414 A1 7/2022
WO 2023288154 A1 1/2023

OTHER PUBLICATIONS

International Search Report and Written Opinion—PCT/US2024/054445—ISA/EPO—Feb. 17, 2025.

\* cited by examiner

*Primary Examiner* — Sung S Ahn
(74) *Attorney, Agent, or Firm* — QUALCOMM Incorporated

(57) ABSTRACT

Multipath angle estimation and reporting for positioning is described. An apparatus is configured to receive a set of multipath signals for a set of VAs. Each VA in the set of VAs is associated with a corresponding reflecting surface in a UE communication environment. Reflection of the set of multipath signals occurs via the corresponding reflecting surface. The apparatus is configured to estimate at least one AoA associated with the set of multipath signals based on at least one of a set of ToF values associated with the set of multipath signals, a UE location, or a VA location. The apparatus is configured to provide, to a network entity, an indication of multipath information associated with the set of multipath signals for the set of VAs. The multipath information includes the at least one AoA associated with at least one multipath signal in the set of multipath signals.

30 Claims, 16 Drawing Sheets

MULTIPATH ANGLE ESTIMATION AND REPORTING FOR NR POSITIONING

TECHNICAL FIELD

The present disclosure relates generally to communication systems, and more particularly, to wireless communications utilizing positioning information.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may comprise a user equipment (UE), and the method may be performed at/by a UE. The apparatus is configured to receive a set of multipath signals for a set of virtual anchors (VAs), where each VA in the set of VAs is associated with a corresponding reflecting surface in a communication environment of the UE, where reflection of the set of multipath signals occurs via the corresponding reflecting surface associated with each VA in the set of VAs. The apparatus is configured to estimate at least one angle of arrival (AoA) associated with the set of multipath signals based on at least one of a set of time of flight (ToF) values associated with the set of multipath signals, a UE location, or a VA location. The apparatus is configured to provide, to a network entity, an indication of multipath information associated with the set of multipath signals for the set of VAs, where the multipath information includes the at least one AoA associated with at least one multipath signal in the set of multipath signals.

In the aspect, the method includes receiving a set of multipath signals for a set of VAs, where each VA in the set of VAs is associated with a corresponding reflecting surface in a communication environment of the UE, where reflection of the set of multipath signals occurs via the corresponding reflecting surface associated with each VA in the set of VAs. The method includes estimating at least one AoA associated with the set of multipath signals based on at least one of a set of ToF values associated with the set of multipath signals, a UE location, or a VA location. The method includes providing, to a network entity, an indication of multipath information associated with the set of multipath signals for the set of VAs, where the multipath information includes the at least one AoA associated with at least one multipath signal in the set of multipath signals.

In another aspect of the disclosure, a method, a computer-readable medium, and an apparatus are provided. The apparatus is configured to provide, for a UE, a signal via a communication channel. The apparatus is configured to receive, from the UE, an indication of multipath information associated with a set of multipath signals, where the set of multipath signals corresponds to the signal provided via the communication channel and a set of VAs associated with a corresponding reflecting surface in a communication environment of the UE, where reflection of the set of multipath signals occurs via the corresponding reflecting surface associated with the set of VAs, where the multipath information includes at least one AoA that is associated with an estimation of at least one multipath signal in the set of multipath signals and that is associated with the at least one multipath signal in the set of multipath signals.

In the aspect, the method includes providing, for a UE, a signal via a communication channel. The method also includes receiving, from the UE, an indication of multipath information associated with a set of multipath signals, where the set of multipath signals corresponds to the signal provided via the communication channel and a set of VAs associated with a corresponding reflecting surface in a communication environment of the UE, where reflection of the set of multipath signals occurs via the corresponding reflecting surface associated with the set of VAs, where the multipath information includes at least one AoA that is associated with an estimation of at least one multipath signal in the set of multipath signals and that is associated with the at least one multipath signal in the set of multipath signals.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
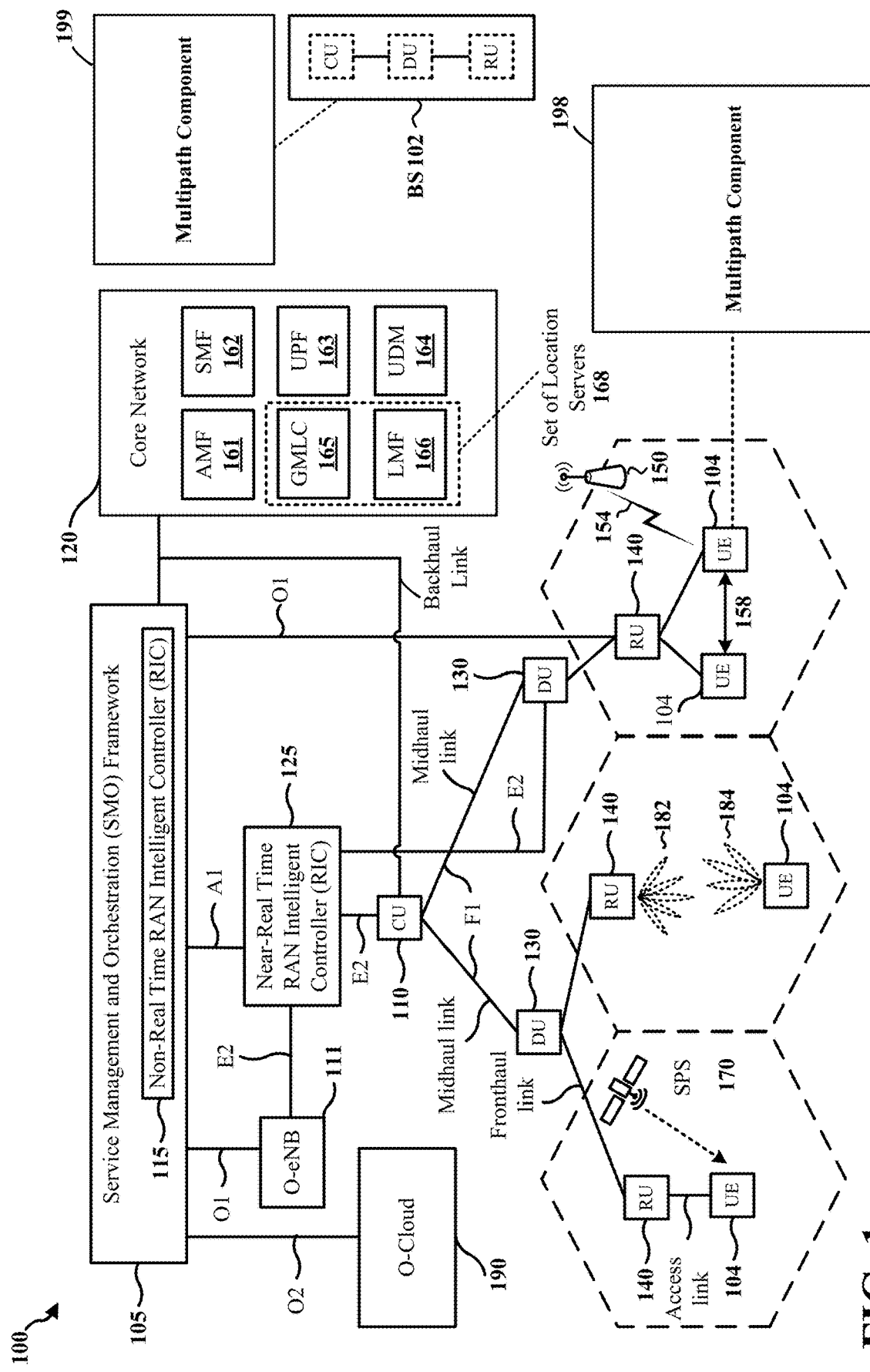
FIG. 1 is a diagram illustrating an example of a wireless communications system and an access network.

Wireless communication networks may be designed to support communications between network nodes (e.g., base stations, gNBs, etc.) and UEs by which positioning for UEs may be determined for network entities (e.g., a base station, a gNB, a Location Management Function (LMF), a sensing server/sensing function, etc.). For example, in the context of enhanced positioning accuracy, a wireless communication network may enable a target device (e.g., a UE) to report its multipath information, indicated as NR-AdditionalPathList, with the three fields of nr-RelativeTimeDifference, nr-PathQuality, and nr-DL-PRS-RSRPP (reference signal received power per-path) for each additional path. In such configurations, improved positioning accuracy may be achieved. An angle of arrival (AoA) for each multipath may also be beneficial to positioning, sensing, and beam selection use cases. Further, reporting additional path phase measurements may also improve positioning, and AoAs for each path may additionally be estimated in multi-antenna receivers.

However, the lack of reporting information per-path, and the corresponding mechanisms of angle measurement requests, reporting, and capability signaling, may prevent further improvements for positioning accuracy. Moreover, methods to estimate AoA for multi-antenna receivers are may include more complexity and/or cost.

Various aspects relate generally to wireless communications utilizing positioning information. Some aspects more specifically relate to multipath angle estimation and reporting for positioning. In some examples, a UE may receive a set of multipath signals, estimate associated AoAs based on a set of VAs, and report angle information on a per-path basis, in addition to values of other multipath signal characteristics. In some examples, a UE and a network entity may be configured to manage angle measurement requests, reporting, and capability signaling for multipath angle estimation and reporting for positioning. In some examples, a UE may be configured to utilize various implementations and/or algorithms for estimating angles using VAs. In some examples, a UE may be configured to estimate AoAs without utilizing more than one antenna of a multi-antenna receivers, e.g., using one antenna.

Particular aspects of the subject matter described in this disclosure can be implemented to realize one or more of the following potential advantages. In some examples, by utilizing VAs, the described techniques can be used to estimate AoAs at a UE for multipath signals on a per-path basis. In some examples, by configuring for and reporting angle information per path, the described techniques can be used to improve UE positioning accuracy. In some examples, by utilizing a set of ToF values associated with the set of multipath signals, a UE location, or a VA location, the described techniques can be used to estimate AoAs at a UE for multipath signals on a per-path basis using one antenna at reduced complexity and cost.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point/a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUS 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a multipath component 198 ("component 198") that may be configured to receive a set of multipath signals for a set of VAs, where each VA in the set of VAs is associated with a corresponding reflecting surface in a communication environment of the UE, where reflection of the set of multipath signals occurs via the corresponding reflecting surface associated with each VA in the set of VAs. The component 198 may be configured to estimate at least one AoA associated with the set of multipath signals based on at least one of a set of ToF values associated with the set of multipath signals, a UE location, or a VA location. The component 198 may be configured to provide, to a network entity, an indication of multipath information associated with the set of multipath signals for the set of VAs, where the multipath information includes the at least one AoA associated with at least one multipath signal in the set of multipath signals. The component 198 may be configured to receive, from the network entity, a global coordinate system configuration associated with the global coordinate system, where the coordinate system indication is indicative of the global coordinate system. The component 198 may be configured to select the local coordinate system associated with the UE, where the coordinate system indication is indicative of the local coordinate system. The component 198 may be configured to provide, for the network entity, a capability indication that is indicative of a capability of the UE to support a number of per-path angles for the set of multipath signals for the set of VAs, where the capability indication includes an angle information reporting capability field having a maximum supported value for the number of per-path angles that are supported by the UE for the indication of the multipath information associated with the set of multipath signals for the set of VAs. The component 198 may be configured to receive, from the network entity, a capability request that is indicative of a provision for the capability indication. The component 198 may be configured to receive, from the network entity, a location information request in a first information element (IE), where the location information request is indicative of an additional paths extension and a request for the provision of the multipath information associated with the set of multipath signals for the set of VAs. In certain aspects, the base station 102 may have a multipath component 199 ("component 199") that may be configured to provide, for a UE, a signal via a communication channel. The component 199 may be configured to receive, from the UE, an indication of multipath information associated with a set of multipath signals, where the set of multipath signals corresponds to the signal provided via the communication channel and a set of VAs associated with a corresponding reflecting surface in a communication environment of the UE, where reflection of the set of multipath signals occurs via the corresponding reflecting surface associated with the set of VAs, where the multipath information includes at least one AoA that is associated with an estimation of at least one multipath signal in the set of multipath signals and that is associated with the at least one multipath signal in the set of multipath signals. The component 199 may be configured to provide, for the UE, a global coordinate system configuration associated with the global coordinate system, where the coordinate system indication is indicative of the global coordinate system. The component 199 may be configured to receive, from the UE, a capability indication that is indicative of a capability of the UE to support a number of per-path angles for the set of multipath signals, where the capability indication includes an angle information reporting capability field having a maximum supported value for the number of per-path angles that are supported by the UE for the indication of the multipath information associated with the set of multipath signals. The component 199 may be configured to provide, for the UE, a capability request that is indicative of the capability indication. The component 199 may be configured to provide, for the UE, a location information request in a first IE, where the location information request is indicative of an additional paths extension and a request for the provision of the multipath information associated with the set of multipath signals. Accordingly, the aspects described herein for multipath angle estimation and reporting for positioning enable a UE to receive a set of multipath signals, estimate associated AoAs based on a set of VAs, and report angle information on a per-path basis, in addition to values of other multipath signal characteristics through angle measurement requests, reporting, and capability signaling for multipath angle estimation and reporting for positioning. Aspects enable estimates of AoAs at a UE for multipath signals on a per-path basis by utilizing VAs, enable improvements of UE positioning accuracy by configuring for and reporting angle information per path, and provide for estimates of AoAs at a UE for multipath signals on a per-path basis using one antenna at reduced complexity and cost by utilizing a set of ToF values associated with the set of multipath signals, a UE location, or a VA location.

Figure 2:
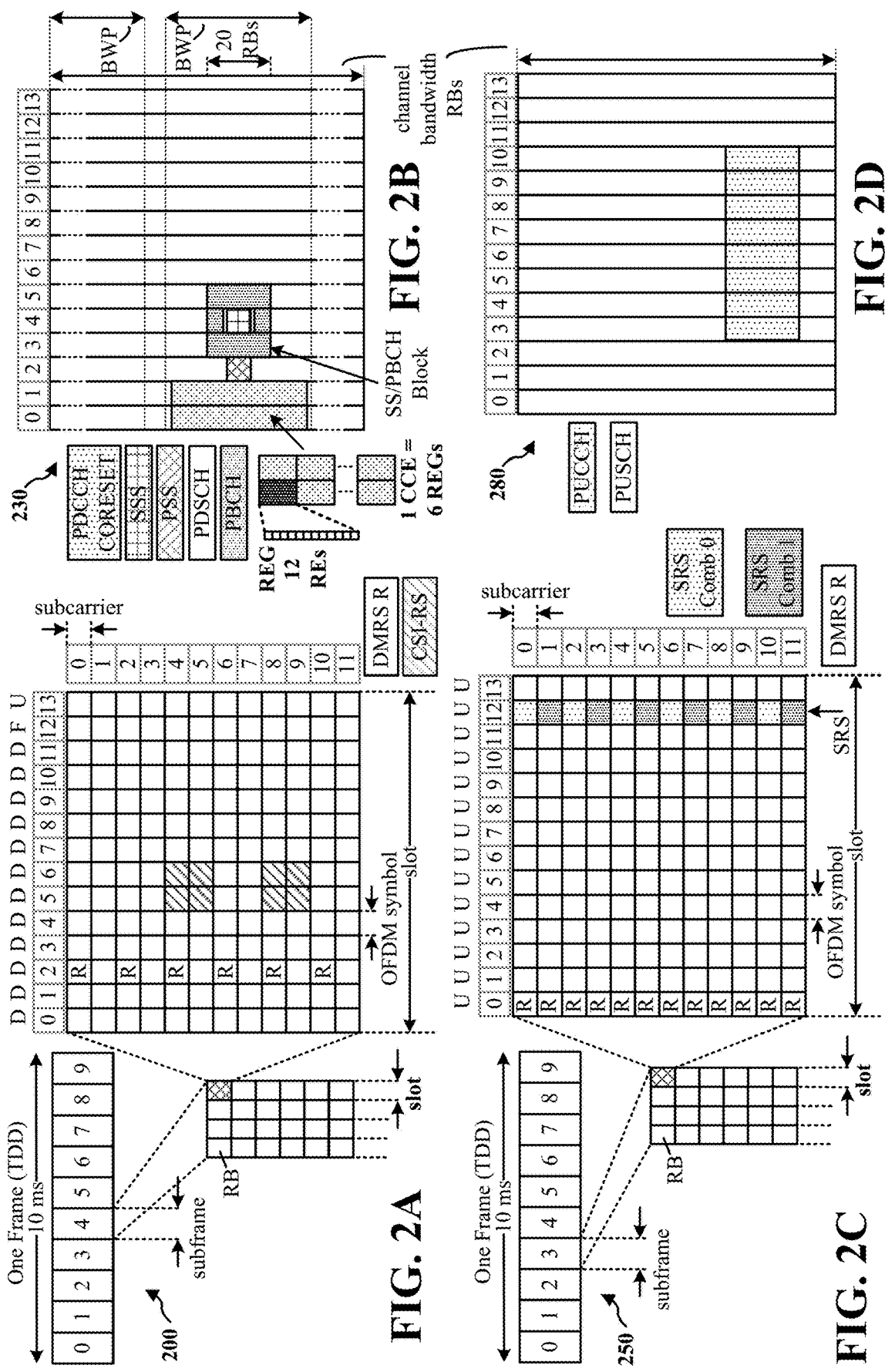
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15 [kHz]$ | Cyclic prefix |
|---|---|---|
| 0 | 15 | Normal |
| 1 | 30 | Normal |

TABLE 1-continued

Numerology, SCS, and CP

| μ | SCS $\Delta f = 2^\mu \cdot 15 [kHz]$ | Cyclic prefix |
|---|---|---|
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and 24 slots/subframe. The subcarrier spacing may be equal to $2^\mu*15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
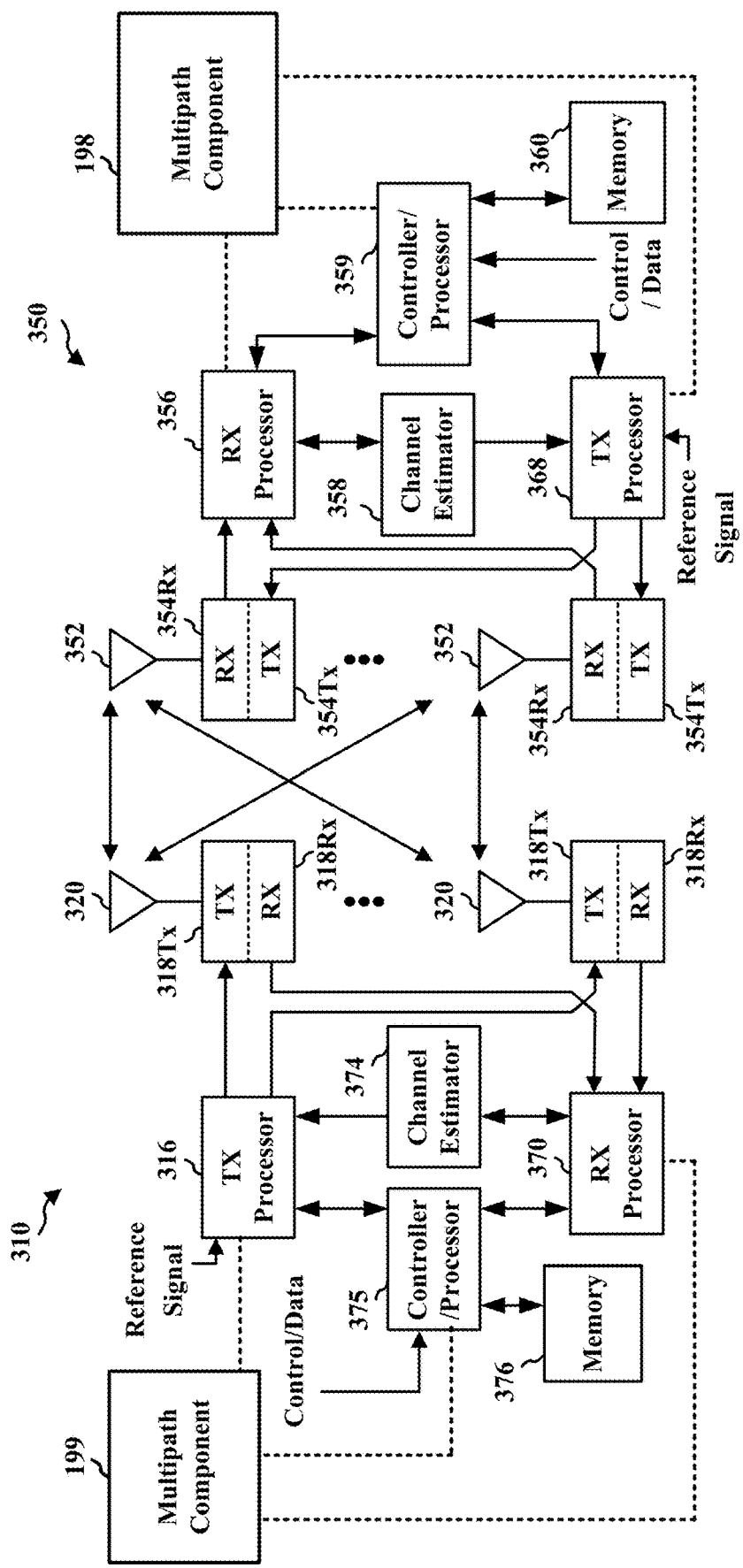
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the component 198 of FIG. 1.

At least one of the TX processor 316, the RX processor 370, and the controller/processor 375 may be configured to perform aspects in connection with the component 199 of FIG. 1.

Figure 4:
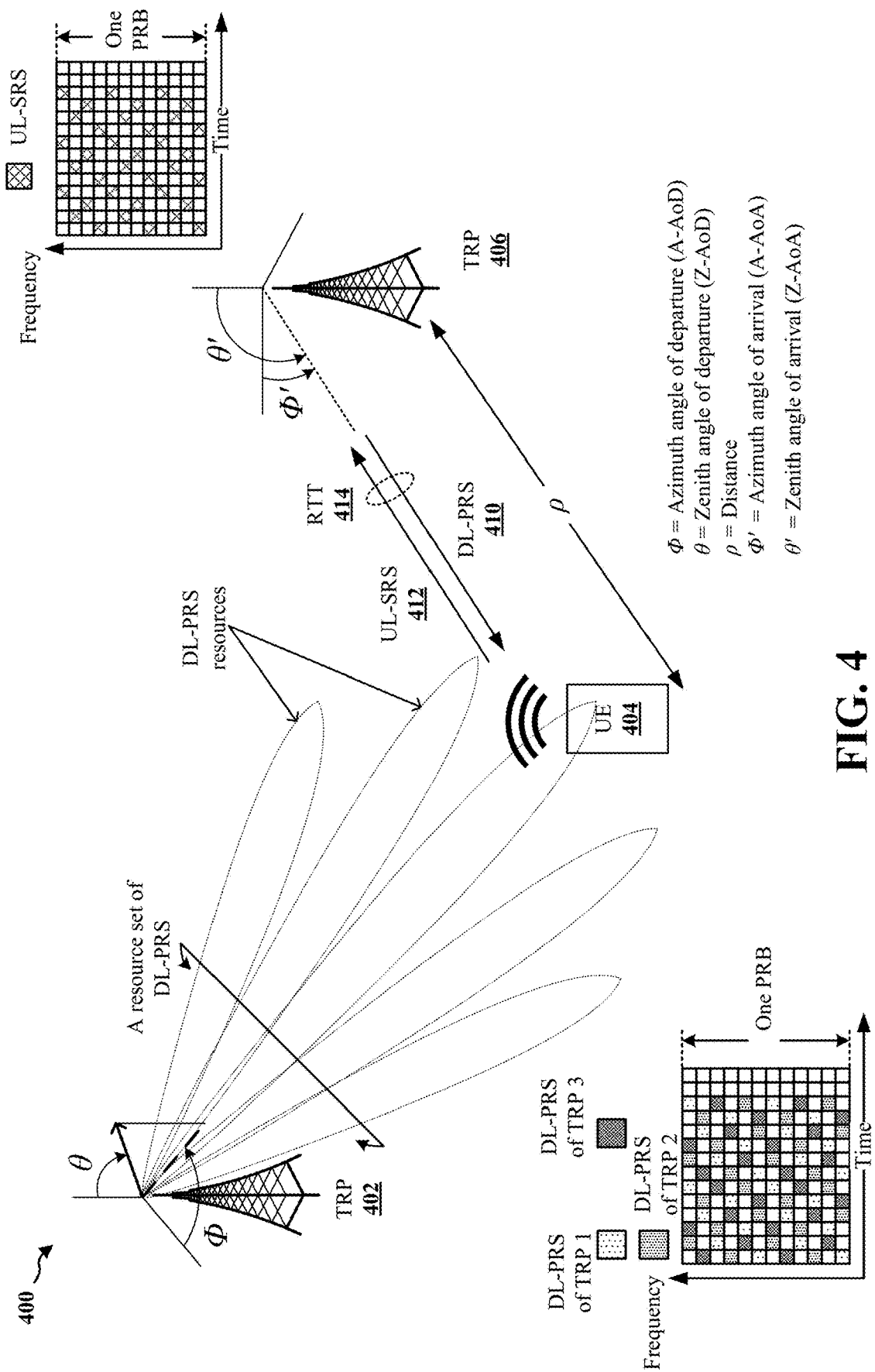
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX}-T_{PRS\_TX}\|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Communications between network nodes and UEs may be used for positioning of UEs and may be determined for network entities. For example, in the context of enhanced positioning accuracy, a wireless communication network may enable a target device (e.g., a UE) to report its multipath information, indicated as NR-AdditionalPathList, with the three fields of nr-RelativeTimeDifference, nr-PathQuality, and nr-DL-PRS-RSRPP (reference signal received power per-path) for each additional path. In such configurations, improved positioning accuracy may be achieved. An AoA for each multipath may also be beneficial to positioning, sensing, and beam selection use cases. Further, reporting additional path phase measurements may also improve positioning, and AoAs for each path may additionally be estimated in multi-antenna receivers. However, the lack of reporting information per-path, and the corresponding mechanisms of angle measurement requests, reporting, and capability signaling, may prevent further improvements for positioning accuracy. Moreover, methods to estimate AoA for multi-antenna receivers are may include more complexity and/or cost.

Figure 5:
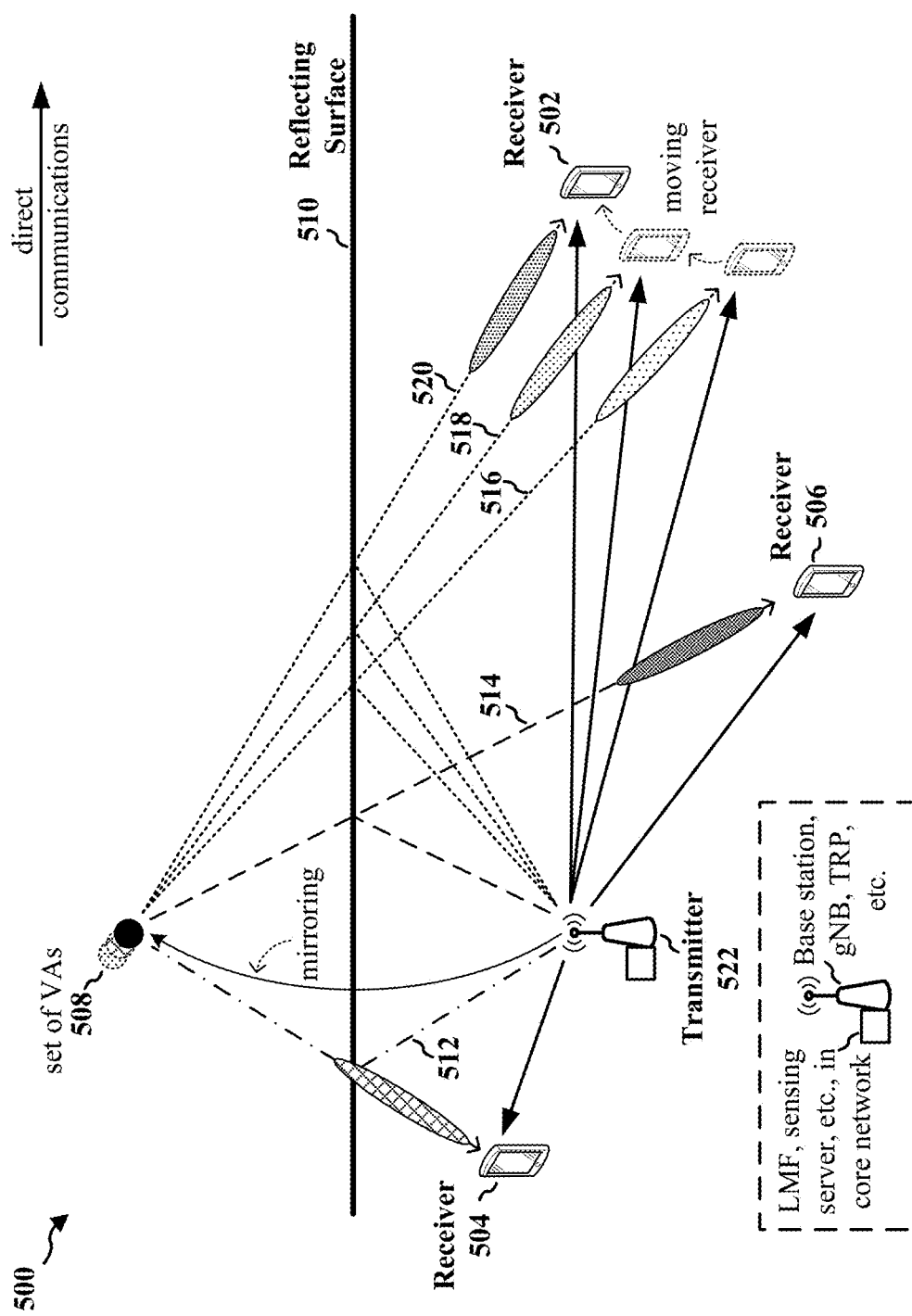
FIG. 5 is a diagram illustrating an example set of VAs.

FIG. 5 is a diagram 500 illustrating an example set of VAs. Diagram 500 shows a receiver 502, a receiver 504, and a receiver 506 in communication with a transmitter 522, and a visualization of a set of VAs 508 (e.g., one or more VAs) and how assigned multipaths to the set of VAs 508 direct towards reflector (which correspond to the set of VAs 508). For case of description and clarity of illustration, diagram 500 is described with respect to a single VA of the set of VAs 508. In aspects, the receiver 502, the receiver 504, and the receiver 506 may be UEs and/or the like, and the transmitter 522 may be a base station, a gNB, an LMF, a sensing server/sensing function (e.g., in a core network), and/or the like.

Aspects herein may utilize a location(s) of the set of VAs 508 to estimate the angles of arrival (AoA) of multipath components at a UE (e.g., the receiver 502, the receiver 504, and the receiver 506). Conceptually, the location of VAs may correspond to strong reflectors in the environment of a UE, which may result in strong clusters in the communication channel(s). By assigning a multipath component to a VA of the set of VAs 508, the direction of arrival of a multipath may be estimated, in aspects. In the scenario illustrated in diagram 500, this direction geometrically points towards a reflector (e.g., a reflecting surface 510) to which the VA corresponds and which provides a mirroring of transmissions from the transmitter 522 by way of reflections.

In the context of multipath assignments and angle estimations, for each VA in the set of VAs 508, an observation model/algorithm may be trained to infer observability of a VA to a receiver/UE location. For example, if a receiver/UE location is observable to a VA of the set of VAs 508, the receiver/UE may be receiving a dominant multipath component from the reflecting surface 510 as represented by the VA. As shown, a multipath component 512 associated with a VA of the set of VAs 508 may be received by the receiver 504 via the reflecting surface 510, and a multipath component 514 associated with the VA of the set of VAs 508 may be received by the receiver 506 via the reflecting surface 510. The receiver 502 may be in motion (e.g., a moving receiver), and may have a set of multipath components (e.g., based on the motion): a multipath component 516, a multipath component 518, and a multipath component 520, as shown by way of example, which may be associated with the VA of the set of VAs 508 and may be received by the receiver 502 via the reflecting surface 510.

Given the location of the VA of the set of VAs 508 and/or a location of the receiver/UE (e.g., the receiver 502, the receiver 504, the receiver 506), the corresponding ToF value of a multipath may be found, and given a location of the VA of the set of VAs and a location of the receiver/UE, the AoA of the multipath may be calculated. In some scenarios, if the 2D position (x, y) for receiver/UE and/or the VA of the set of VAs 508 is available, but not height, the azimuthal AoA may be estimated but not the elevational AoA. In other scenarios, if heights of the receiver/UE and the VA of the set of VAs 508 are known, as well as the 2D positions, the elevational AoA may be estimated.

Aspects herein may realize potential use cases of VAs or virtual TRPs (vTRPs), e.g., in the context of current and next generation wireless network implementations, for purposes of multipath angle estimation. Aspects utilize VAs and/or vTRPs to estimate AoA of received multipaths at a UE. Conceptually, the location of VAs may correspond to strong reflectors in the environment, which result in strong clusters in the communication channel. For each additional reported path, the device may report additionally the angle of the path. Moreover, a quality field may specify an estimate of the quality of the estimated angle. Furthermore, an IE (e.g., NR-DL-TDOA-ProvideCapabilities) may be used by the target device to indicate its capability to support NR DL-TDOA, as well as other techniques supporting path reporting.

The aspects described herein for multipath angle estimation and reporting for positioning enable a UE to receive a set of multipath signals, estimate associated AoAs based on a set of VAs, and report angle information on a per-path basis, in addition to values of other multipath signal characteristics. Aspects provide for a UE and a network entity to be configured to manage angle measurement requests, reporting, and capability signaling for multipath angle estimation and reporting for positioning. Aspects further provide for a UE to be configured to utilize various implementations and/or algorithms for estimating angles using VAs, where a UE may be configured to estimate AoAs without utilizing more than one antenna of a multi-antenna receivers, e.g., using one antenna. Aspects enable estimates of AoAs at a UE for multipath signals on a per-path basis by utilizing VAs. Aspects also enable improvements of UE positioning accuracy by configuring for and reporting angle information per path. Aspects further provide for estimates of AoAs at a UE for multipath signals on a per-path basis using one antenna at reduced complexity and cost by utilizing a set of ToF values associated with the set of multipath signals, a UE location, or a VA location. While aspects herein are described in the context of VAs, it should be noted that aspects also contemplate vTRPs in addition to, or in lieu of, VAs.

Figure 6:
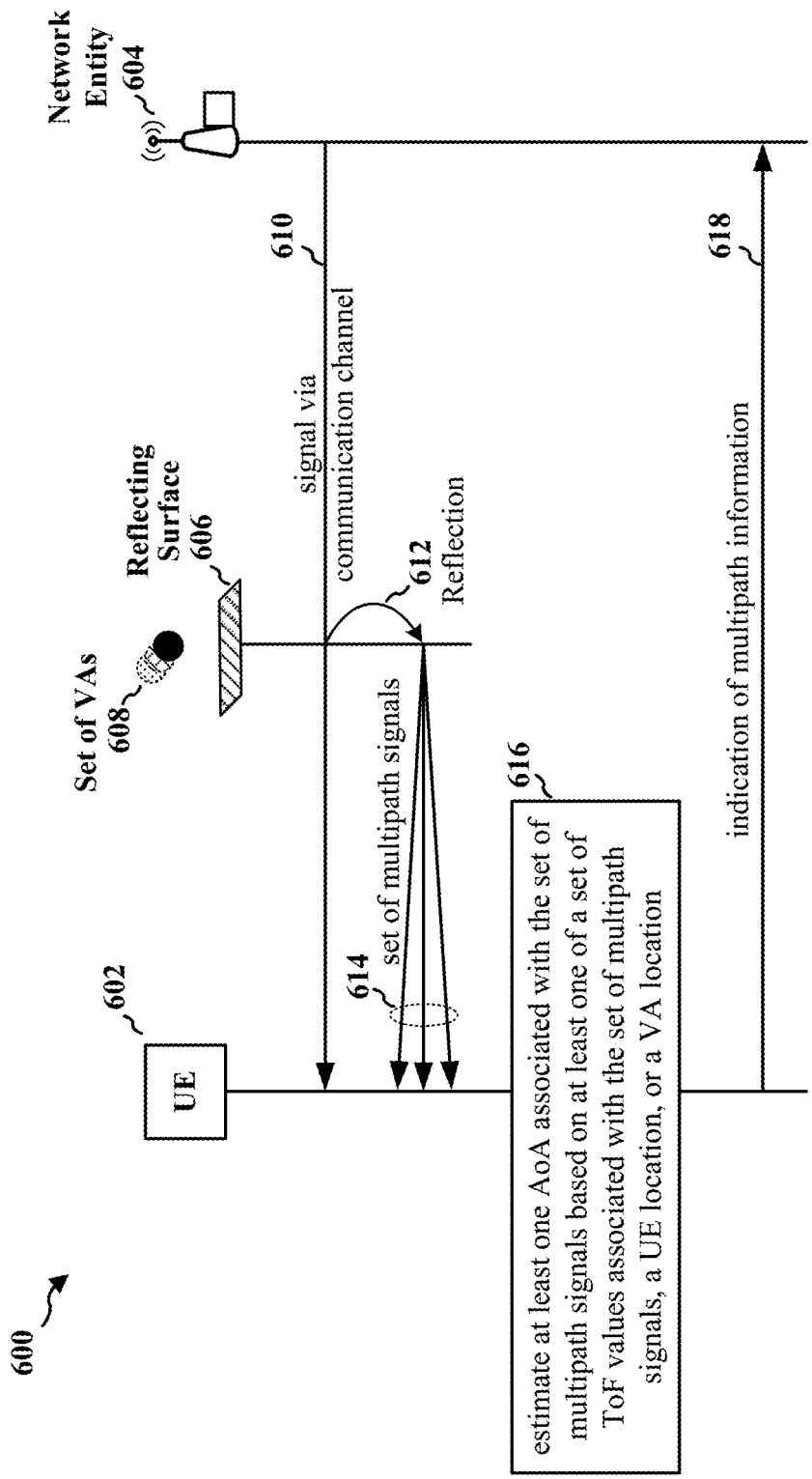
FIG. 6 is a call flow diagram for wireless communications, in accordance with various aspects of the present disclosure.

FIG. 6 is a call flow diagram 600 for wireless communications, in various aspects. Call flow diagram 600 illustrates multipath angle estimation and reporting for positioning for a wireless device (a UE 602, by way of example) that communicates with the network entity 604 (e.g., a base station, such as a gNB or other type of base station, by way of example, a TRP, an LMF, a sensing server, etc.), in various aspects, and where a reflecting surface 606 and a set of VAs 608 (which may be associated with the reflecting surface 606) may be utilized for at least some of such communications by way of reflection. Aspects described for the network entity 604, and for network entities herein, generally, may be performed by a base station in aggregated form and/or by one or more components of the base station in disaggregated form, similarly by a gNB, by an LMF, and/or by a sensing server. Additionally, or alternatively, the aspects may be performed by the UE 602 autonomously, in addition to, and/or in lieu of, operations of the network entity 604. The reflecting surface 606 may be any type of surface/material that reflects radio frequencies utilized for communications between the UE 602 and the network entity 604, and a VA of the set of VAs 608 may be a conceptual representation of a point in the environment that symmetrically mirrors the network entity 604 in space, via the reflecting surface 606.

In aspects, the UE 602 may be configured to transmit/provide, and the network entity 604 may be configured to receive, a capability indication that is indicative of a capability of the UE 602 to support a number of per-path angles for the set of multipath signals 614 for the set of VAs 608. The capability indication may include an angle information reporting capability field having a maximum supported value for the number of per-path angles that are supported by the UE 602 for the indication of the multipath information 618 associated with the set of multipath signals 614 for the set of VAs 608. In some aspects, the UE 602 may be configured to receive, and the network entity 604 may be configured to transmit/provide, a capability request that is indicative of a provision for the capability indication. In such aspects, the UE 602 may be configured to provide the capability indication based on the capability request.

In aspects, the UE 602 may be configured to receive, and the network entity 604 may be configured to transmit/provide, a coordinate system indication. The coordinate system indication may be indicative of a global coordinate system or of a local coordinate system associated with the UE 602. For example, the UE 602 may be configured to receive a global coordinate system configuration with the coordinate system indication, or may be configured to select a local coordinate system (e.g., that may be stored in at least one memory at the UE 602) based on the coordinate system indication. In one configuration, the UE 602 may be configured to receive, from the network entity 604, the global coordinate system configuration associated with the global coordinate system, where the coordinate system indication is indicative of the global coordinate system. In another configuration, the UE 602 may be configured to select the local coordinate system associated with the UE 602, where the coordinate system indication is indicative of the local coordinate system.

In aspects, the UE 602 may be configured to receive, and the network entity 604 may be configured to transmit/provide, a location information request in a first IE. The location information request may be indicative of an additional paths extension and a request for the provision of the multipath information, associated with the set of multipath signals 614 for the set of VAs 608, that is indicated by the indication of multipath information 618, described below.

In aspects, the UE 602 may be configured to receive, and the network entity 604 may be configured to transmit/provide, a signal 610 via a communication channel. The UE 602 may also be configured to receive, via a reflection 612 off of the reflecting surface 606 that is associated with the set of VAs 608, a set of multipath signals 614 that are based on the signal 610 transmitted/provided by the network entity 604 via the communication channel. In aspects, each VA in the set of VAs 608 may associated with a corresponding reflecting surface (e.g., the reflecting surface 606) in a communication environment of the UE 602, where the reflection 612 of the set of multipath signals 614 may correspondingly occur via the reflecting surface 606 associated with each VA in the set of VAs 608.

The UE 602 may be configured to estimate (at 616) at least one AoA associated with the set of multipath signals 614 based on at least one of a set of ToF values associated with the set of multipath signals 614, a UE location (e.g., of the UE 602), or a VA location of a VA in the set of VAs 608. In aspects, to estimate (at 616) the at least one AoA associated with the set of multipath signals 614, the UE 602 may be configured to obtain the set of ToF values associated with the set of multipath signals 614 based on at least one of the UE location or the VA location. In aspects, to obtain the set of ToF values associated with the set of multipath signals 614, the UE 602 may be configured to obtain or train an observation model associated with the set of VAs 608 based on at least one of the UE location or the VA location, and the UE 602 may be configured to obtain the set of ToF values associated with the set of multipath signals 614 based on the observation model associated with the set of VAs 608.

In aspects, the UE 602 may be configured to receive the set of multipath signals 614 via at least one antenna (e.g., via a single antenna, via two or more antennas, etc.). In such aspects, the UE 602 may be configured to estimate (at 616) the at least one AoA associated with the set of multipath signals 614 received via the at least one antenna (e.g., via a single antenna).

The UE 602 may be configured to transmit/provide, and the network entity 604 may be configured to receive, an indication of multipath information 618. The indication of multipath information 618 may be associated with the set of multipath signals 614 for the set of VAs 608, where the multipath information indicated by the indication of multipath information 618 may include at least one AoA associated with at least one multipath signal in the set of multipath signals 614. That is, for each additional reported path, the UE 602 may be configured to report, additionally, the angle of the path. In aspects, the UE 602 may be configured to provide, e.g., with or in addition to the indication of multipath information 618, a coordinate system indication that may be indicative of a local coordinate system associated with a local environment the UE 602 or a global coordinate system associated with a global environment. The AoA(s) associated with the multipath signal(s) in the set of multipath signals 614 may be associated with coordinates that correspond to the coordinate system indication (e.g., either local or global).

The multipath information indicated by the indication of multipath information 618 may include a set of angle fields for an azimuthal angle and/or an elevational angle of the AoA(s) associated with the multipath signal(s) in the set of multipath signals 614. In aspects, one or more fields of the set of angle fields for the azimuthal angle and/or the elevational angle may include a respective set of integers associated with at least one of an angle value range or an angle decimal value range.

In aspects, the set of multipath signals 614 may include a first multipath signal and second multipath signal, where the first multipath signal is associated with a first AoA of the at least one AoA and the second multipath signal is associated with a second AoA of the at least one AoA. The first AoA is different from the second AoA, in aspects, and the respective set of integers for the second AOA may indicate a difference value from at least one of the angle value range or the angle decimal value range for the first AoA. Accordingly, an amount of data/information transmitted/provided for the indication of multipath information 618 may be reduced. The multipath information indicated by the indication of multipath information 618 may include a set of quality fields for at least one quality estimate for the at least one AoA associated with the set of multipath signals 614. The set of quality fields may include one or more angle fields corresponding to each multipath signal of the set of multipath signals 614, or may include one or more joint fields corresponding to associated pairs of AoAs and ToF values of the at least one AoA and the set of ToF values.

In aspects, based on a reception of the location information request from the network entity 604, the UE 602 may be configured to transmit/provide the indication of multipath information 618 as a location information request response in a second IE and based on a threshold condition associated with a RSRPP for each multipath signal in the set of multipath signals 614. In aspects, where an estimation (e.g., at 616) by the UE 602 is absent for an additional AoA associated with an additional multipath signal of the set of multipath signals 614, the UE 602 may be configured to include in the indication of the multipath information 618 an indication, express or implicit, of the absence.

Figure 7:
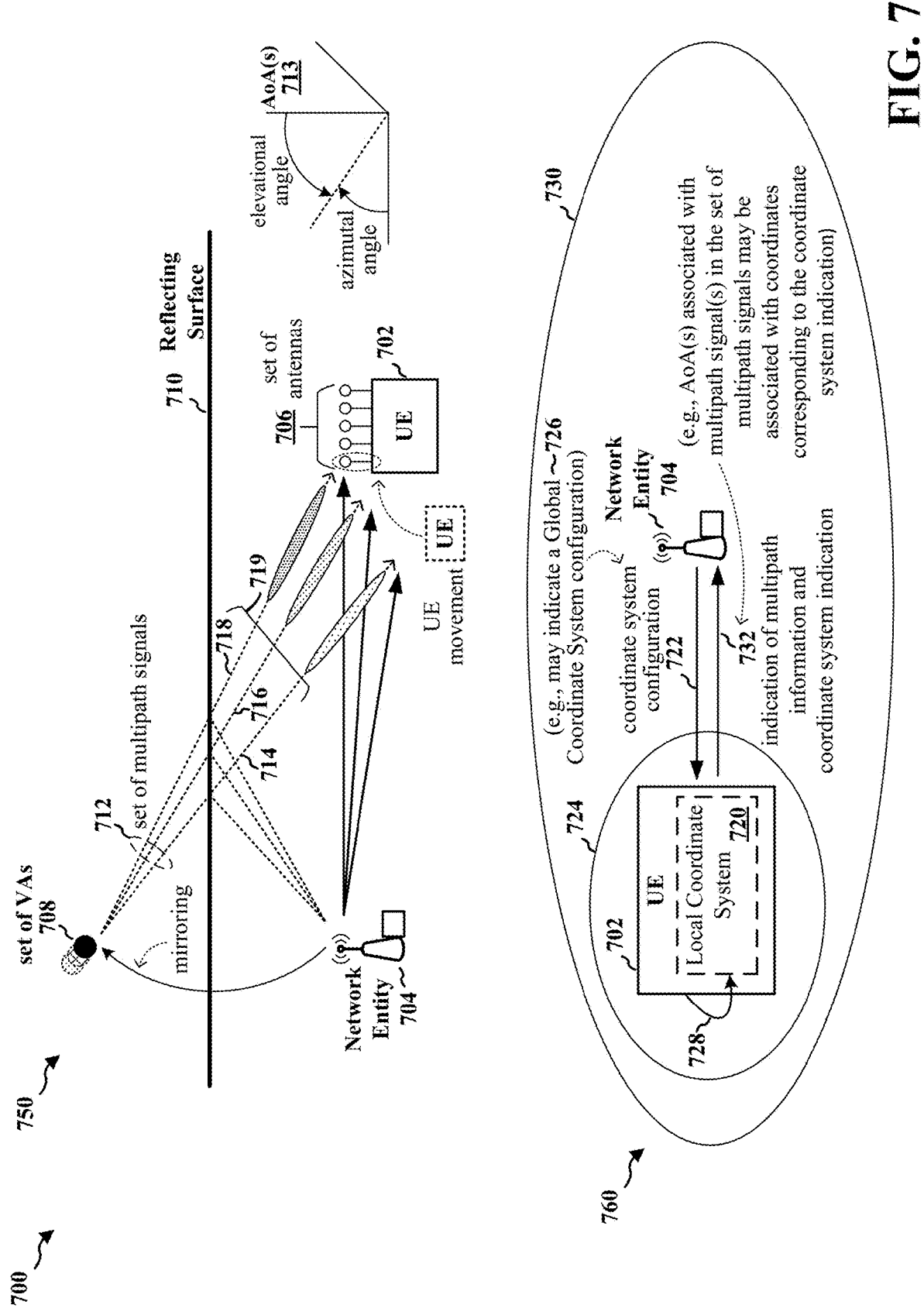
FIG. 7 is a diagram illustrating an example set of VAs and a set of multipath signals associated therewith, and examples of coordinate systems, in accordance with various aspects of the present disclosure.

FIG. 7 is a diagram 700 illustrating an example set of VAs and a set of multipath signals associated therewith, and examples of coordinate systems, in various aspects. diagram 700 shows a configuration 750 associated with an example set of VAs and a set of multipath signals associated therewith, as well as a configuration 760 for example coordinate systems. The configuration 750 and the configuration 760 are illustrated in the context of a UE 702, a network entity 704, and a set of VAs 708 associated with a reflecting surface 710 and a set of multipath signals 712.

In the configuration 750, the UE 702 may be in motion, e.g., have UE movement, and may receive the set of multipath signals 712, which the network entity 704 may be configured to transmit/provide. The set of multipath signals 712 may include one or more multipath signals, in aspects, and in the illustrated aspects, three multipath signals are shown: a multipath signal 714, a multipath signal 716, and a multipath signal 718, each having a respective ToF value that comprises a set of ToF values 719. The reflecting surface 710 may be any type of surface/material that reflects radio frequencies utilized for communications between the UE 702 and the network entity 704, and a VA of the set of VAs 708 may be a conceptual representation of a point in the environment that symmetrically mirrors the network entity 704 in space, via the reflecting surface 710. Accordingly, the set of multipath signals 712 received by the UE 702 may be based on such reflections.

The UE 702 may include a set of antennas 706 of an antenna module. As noted above, a UE, e.g., the UE 702, may be configured to receive the set of multipath signals 712 via at least one antenna (e.g., via a single antenna, via two or more antennas, etc.) of the set of antennas 706. In such aspects, the UE 702 may be configured to estimate (e.g., at 616 in FIG. 6, described above) at least one AoA 713 associated with the set of multipath signals 712 received via the at least one antenna (e.g., via a single antenna) of the set of antennas 706.

In the configuration 760, the UE 702 may be configured to receive, and the network entity 704 may be configured to transmit/provide, a coordinate system configuration 722, as described above. The coordinate system configuration 722 may be indicative of a local coordinate system 720 associated with a local environment 724 of the UE 702 or a global coordinate system 726 associated with a global environment 730 (e.g., system-wide, world-wide, etc.). The at least one AoA 713 associated with the multipath signal(s), e.g., in the set of multipath signals 712, may be associated with coordinates that correspond to the coordinate system configuration 722 (e.g., either local or global).

In aspects, if the coordinate system configuration 722 indicates the local coordinate system 720 associated with the local environment 724, the UE 702 may be configured to select (at 728) the local coordinate system 720 (e.g., that may be stored in at least one memory at the UE 702) and to utilize the local coordinate system 720 for AoA estimation/reporting of the at least one AoA 713. In other aspects, if the coordinate system configuration 722 indicates and provides the global coordinate system 726 associated with the local environment 724, the UE 702 may be configured to utilize the global coordinate system 726 for the at least one AoA 713 estimation/reporting.

Figure 8:
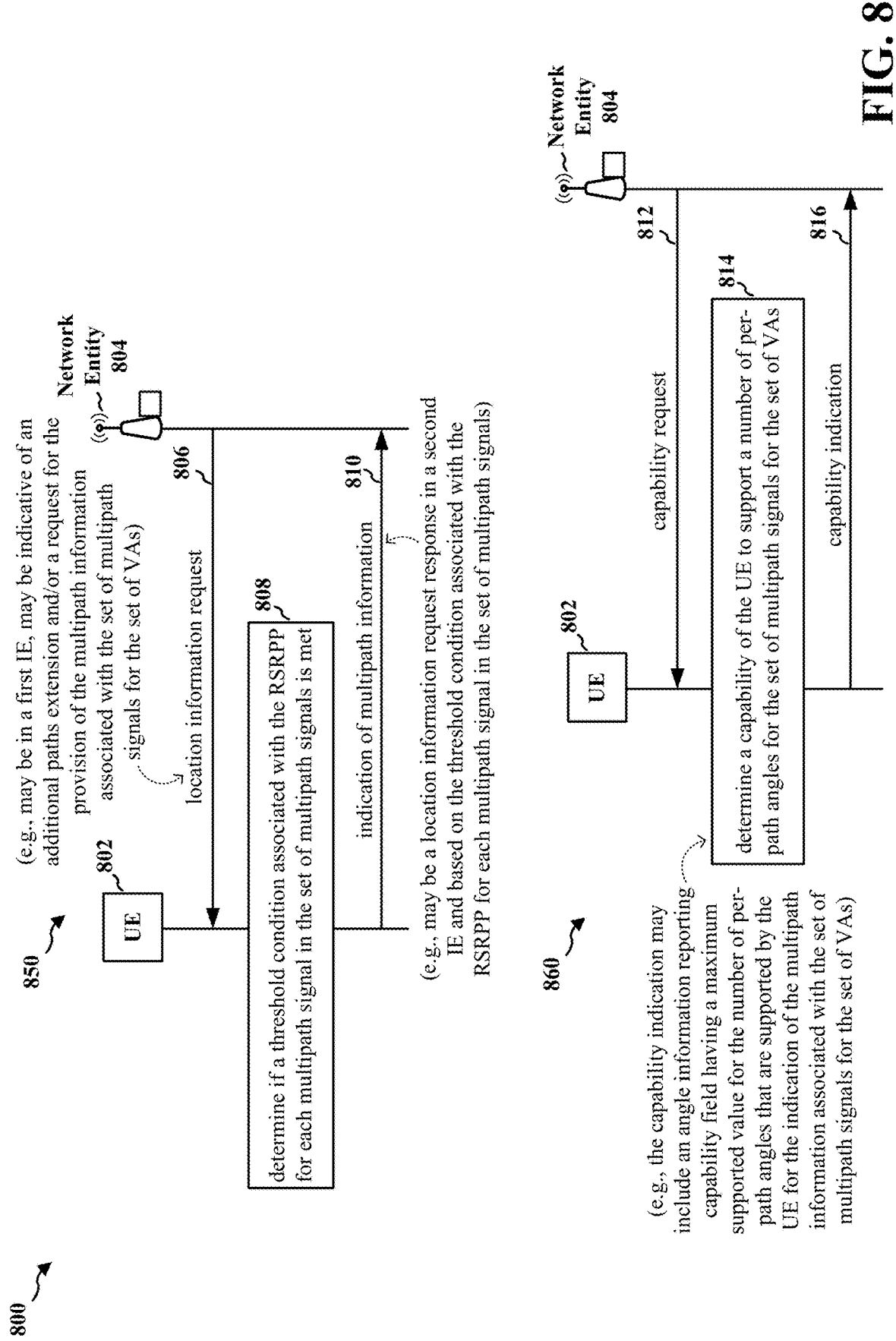
FIG. 8 is a diagram illustrating example configurations for multipath angle estimation and reporting for positioning, in accordance with various aspects of the present disclosure.

FIG. 8 is a diagram 800 illustrating example configurations for multipath angle estimation and reporting for positioning, in various aspects. Diagram 800 shows a configuration 850 and a configuration 860 associated with multipath angle estimation and reporting for positioning in the context of a UE 802 and a network entity 804.

In the configuration 850, the UE 802 may be configured to receive, and the network entity 804 may be configured to transmit/provide, a location information request 806. In aspects, the location information request 806 may be included in a first IE. The location information request 806 may be indicative of an additional paths extension and a request for the provision of the multipath information associated with the set of multipath signals for the set of VAs (e.g., the indication of multipath information 618 in FIG. 6). In one example, the network entity 804 may request, using location information request 806, that the UE 802 report angle information per additional path. Such a request may be in a first IE, e.g., NR-DL-TDOA-RequestLocationInformation in the context of DL-TDOA location measurements, and may indicate that the report of the angle information per additional path be in a second IE, e.g., in the nr-AdditionalPathListExt in the IE for NR-DL-TDOA-SignalMeasurementInformation (where if this field is present, the field for additionalPaths is absent). It should be noted, however, that TDOA is used here as an illustrative example, and that angle reporting may be valid/utilized not just for a TDOA context, but also for other techniques supporting path reporting, according to aspects. That is, path reporting, according to aspects, may be supported for any type of positioning and/or sensing techniques as well, such as time of arrival (TOA) and/or other signaling.

The UE 802 may be configured to determine (at 808) if a threshold condition associated with the RSRPP for each multipath signal in the set of multipath signals is met. In aspects, the threshold condition may be that a given RSRPP meet and/or exceed a configured value. In such aspects, the UE 802 may be configured to provide the indication of multipath information 810 (e.g., an aspects of the indication of multipath information 618 in FIG. 6) as a location information request response in a second IE and based on the threshold condition associated with a RSRPP for each multipath signal in the set of multipath signals (e.g., as determined at 808). That is, the threshold condition may be configured for the UE 802 by the network entity 804 (e.g., an LMF, sensing server, gNB, etc.) so that the multipaths with an RSRPP at or above the configured threshold are reported by the UE 802 along with the angle(s).

In the configuration 860, the UE 802 may be configured to receive, and the network entity 804 may be configured to transmit/provide, a capability request 812 that is indicative of the provision for a capability indication 816.

The IE NR-DL-TDOA-ProvideCapabilities may be used by a target device to indicate its capability to support NR DL-TDOA and to provide its NR DL-TDOA positioning capabilities to a location server. The additionalPathsExtSupport field, if present, may indicate that the target device supports the nr-AdditionalPathListExt reporting in the IE NR-DL-TDOA-SignalMeasurementInformation. The enumerated value may indicate the number of additional paths supported by the target device. The additionalPathsPowerSupport field, if present, indicates that the target device may support the nr-DL-PRS-RSRPP for the additional paths in IE NR-AdditionalPathList.

According to aspects, the UE 802 may be configured to determine (at 814) a capability of the UE 802 to support a number of per-path angles for the set of multipath signals for the set of VAs. For example, the UE may be configured to determine (at 814) data/information associated with its capability for an angle information reporting capability field. In aspects, the angle information reporting capability field may include a maximum supported value for the number of per-path angles that are supported by the UE 802 for the indication of multipath information (e.g., 810; 618 in FIG. 6) associated with the set of multipath signals for the set of VAs.

The UE 802 may be configured to transmit/provide, and the network entity 804 may be configured to receive, the capability indication 816 that is indicative of a capability of the UE 802 to support a number of per-path angles for the set of multipath signals for the set of VAs. The capability indication 816 may include the angle information reporting capability field having the maximum supported value for the number of per-path angles that are supported by the UE 802 for the indication of multipath information (e.g., 810; 618 in FIG. 6) associated with the set of multipath signals for the set of VAs. In aspects, the angle information reporting capability field may be a field for additionalPathsAngleSupport.

In aspects, as shown, the UE 802 capability/angle information reporting capability field may be requested by the network entity 804 (e.g., the network entity 804 may request the UE 802 to report its capability for angle measurements, as for the capability request 812), while in other aspects, the UE 802 may be configured to report its capability to the network entity 804 in an unsolicited manner/autonomously/unprompted. In aspects where the capability request 812 is transmitted/provided by the network entity 804, the UE 802 may be configured to provide the capability indication 816 based on the capability request 812. In aspects, the capability indication 816 may be indicative of the UE 802 not being able to generate a given angle(s). Inn such aspects, the UE 802 may provide an express indication for its inability to generate the given angle(s) (e.g., with a reason), or may provide an implicit indication of its inability to generate the given angle(s) (e.g., an absence of an express indication, such as when other express indications are provided).

Figure 9:
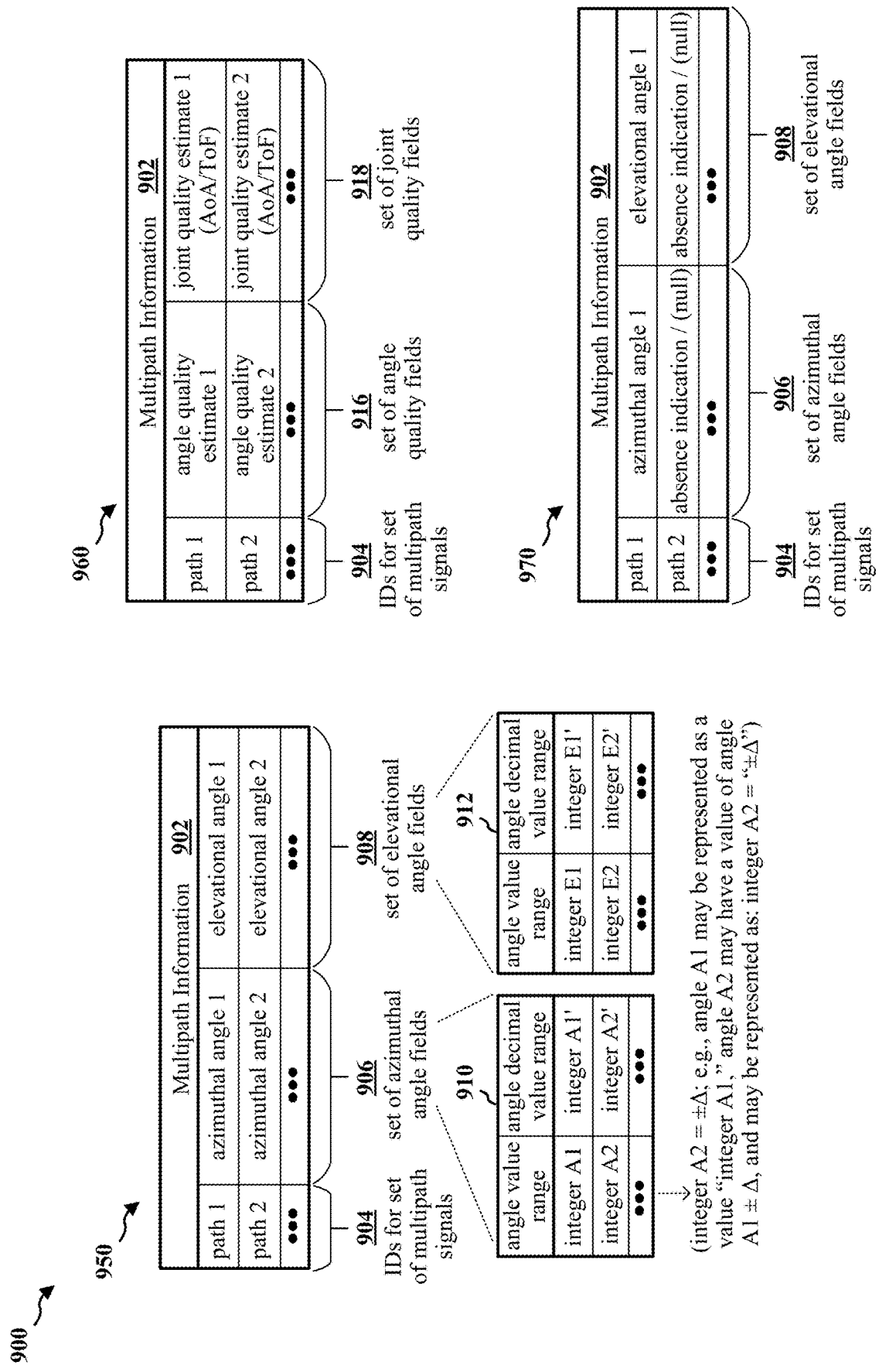
FIG. 9 is a diagram illustrating example configurations for multipath angle estimation and reporting for positioning, in accordance with various aspects of the present disclosure.

FIG. 9 is a diagram 900 illustrating example configurations for multipath angle estimation and reporting for positioning, in various aspects. Diagram 900 shows a configuration 950, a configuration 960, and a configuration 970, for multipath angle estimation and reporting for positioning, each illustrating aspects associated with an indication of multipath information 902. The indication of multipath information 902 may be an aspect of the indication of multipath information 618 in FIG. 6, the indication of multipath information and coordinate system indication 732 in FIG. 7, and/or the indication of multipath information 810 in FIG. 8. The configuration 950, the configuration 960, and the configuration 970 are not mutually exclusive with respect to the illustrated aspects for the indication of multipath information 902 and may be utilized in any combination thereof.

In the configuration 950, the indication of multipath information 902 may include/indicate angle estimates for each multipath reported, e.g., a set of multipath signals. As shown, each multipath signal in a set of multipath signals may include respective identifiers (IDs) 904, e.g., a first path ("path 1") and a second path ("path 2"). While two multipath signals are shown for the set of multipath signals to be reported, multipath information for fewer or additional paths may be estimated/reported.

In the illustrated aspect, the multipath information of the indication of multipath information 902 may include a set of angle fields for at least one of an azimuthal angle or an elevational angle of the at least one AoA associated with the at least one multipath signal in the set of multipath signals: a set of azimuthal angle fields 906 and a set of elevational angle fields 908 (e.g., collectively, a set of angle fields), each of which may include a field for each multipath signal in the set of multipath signals reported. That is, a reported angle may be represented by an azimuthal angle (e.g., in a range of 0° to 360°) and/or an elevational angle (e.g., in a range of 0° to 180°).

In aspects, one or more fields of the set of angle fields for at least one of the azimuthal angle (e.g., the set of azimuthal angle fields 906) or the elevational angle (e.g., the set of elevational angle fields 908) may include a respective set of integers (e.g., a set of integers 910 and/or a set of integers 912) associated with at least one of an angle value range or an angle decimal value range. As illustrated, by way of example, the set of integers 910 may be associated with the set of azimuthal angle fields 906 and the set of integers 912 may be associated with the set of elevational angle fields 908. The angle range values of the set of integers 910 are represented as an integer A1, an integer A2, . . . , to an integer AN, and the angle range decimal values of the set of integers 910 are represented as an integer A1', an integer A2', . . . , to an integer AN', where, when combined, an angle range value and an angle range decimal value provide an angle value (e.g., integer A1.integer A1'). The angle range values of the set of integers 912 are represented as an integer E1, an integer E2, . . . , to an integer EN, and the angle range decimal values of the set of integers 912 are represented as an integer E1', an integer E2', . . . , to an integer EN', where, when combined, an angle range value and an angle range decimal value provide an angle value (e.g., integer E1.integer E1'). Accordingly, finer reporting may be realized using decimals (e.g., in tenths of a degree (0.1° increments).

In aspects, a set of multipath signals may include a first multipath signal (e.g., path 1) and second multipath signal (e.g., path 2), where the first multipath signal is associated with a first AoA (e.g., integer A1, integer A1'; integer E1, integer E1') of the at least one AoA and the second multipath signal is associated with a second AoA (e.g., integer A2, integer A2'; integer E2, integer E2') of the at least one AoA, and the first AoA is different from the second AoA (e.g., integer A1≠integer A2; integer E1≠integer E2). In such aspects, the respective set of integers for the second AOA (e.g., integer A2, integer A2'; integer E2, integer E2') may indicate and/or be represented as a difference value or delta (e.g., ±Δ) from at least one of the angle value range or the angle decimal value range for the first AoA. That is, a first path angle (e.g., integer A1, integer A1') may be specified/represented with its actual value, and angles of one or more additional paths (e.g., from the subset of path 2 to path N) may be specified/represented by their respective difference from the first path (e.g., path 1) angle. As an illustrative example, assume a value of the integer A1 for path 1 to be 120 degrees and a value of the integer A2 for path 2 to be 130 degrees. In some aspects, both of these values may be reported. However, other aspects provide for the value of integer A2 to be represented and reported in the set of integers 910 as 10 degrees (e.g., 130 degrees−120 degrees=10 degrees) and the value of the integer A1 to be reported as 120 degrees. Accordingly, the size of a reporting message may be reduced by utilizing fewer bits to convey the angle information.

In the configuration 960, the indication of multipath information 902 may include quality estimates. In aspects, a set of quality fields (e.g., a set of angle quality fields 916 and/or a set of joint quality fields 918) for at least one quality estimate for the at least one AoA associated with the set of multipath signals. The set of quality fields (e.g., the set of angle quality fields 916 and/or the set of joint quality fields 918) may include one or more angle fields (e.g., the set of angle quality fields 916) corresponding to each multipath signal of the set of multipath signals (e.g., path 1, path 2, etc.), or may include one or more joint fields (e.g., the set of joint quality fields 918) corresponding to associated pairs of AoAs and ToF values of the at least one AoA and the set of ToF values.

A quality field, as described herein (e.g., of the set of angle quality fields 916 and/or of the set of joint quality fields 918), may be used by a device (e.g., a UE) to specify the best estimate performed by the device of the quality of the estimated angle of an additional path(s). This field(s) may be defined per path for angle estimation quality, or defined as a field(s) defining quality of joint time and angle estimation, in aspects.

In the configuration 970, the indication of multipath information 902 may include an indication(s) for one or more angles of which an estimate was not able to be performed. That is, a UE may be configured to indicate if it is not able to generate an angle(s), and when such a scenario occurs, an express indication for the lack of angle (e.g., a configured absence value, which may also include a reason by way of a configured code), or an implicit indication for the lack of angle (e.g., an absence of an IE containing the angle information or a null value) may be provide by the UE as part of the indication of multipath information 902. As examples, such as when an additional estimation by a UE is absent for an additional AoA associated with an additional multipath signal of the set of multipath signals, the UE may be configured to transmit/provide the indication of multipath information 902 associated with the set of multipath signals for the set of VAs as being indicative of at least one of the absence for the additional AoA associated with the additional multipath signal or a reason for the absence, or the UE may be configured to transmit/provide the indication of the multipath information associated with the set of multipath signals for the set of VAs excludes additional multipath information associated with the additional AoA associated with the additional multipath signal.

Figure 10:
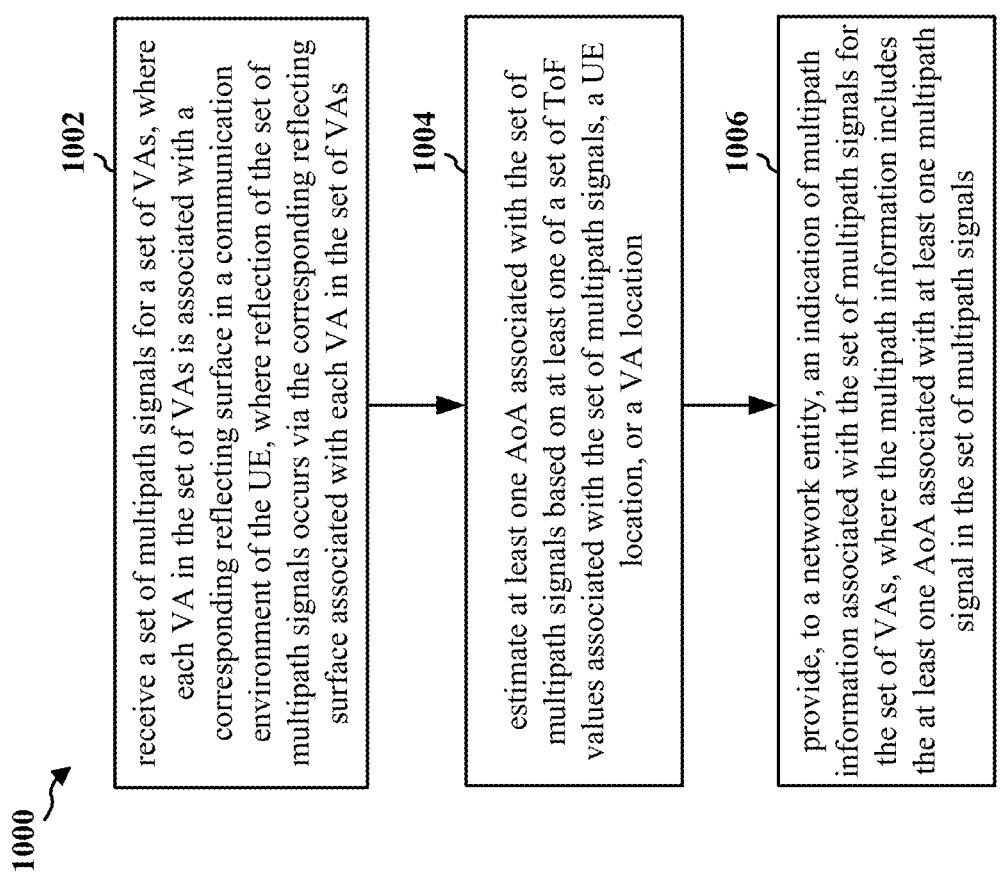
FIG. 10 is a flowchart of a method of wireless communication, in accordance with various aspects of the present disclosure.

FIG. 10 is a flowchart 1000 of a method of wireless communication. The method may be performed by a UE (e.g., the UE 104, 404, 602, 702, 802; the receiver 502; the apparatus 1404). In some aspects, the method may include aspects described in connection with the communication flow in FIG. 6 and/or aspects described in FIGS. 4, 5, 7, 8, 9. The method may be for multipath angle estimation and reporting for positioning. The method may enable a UE to receive a set of multipath signals, estimate associated AoAs based on a set of VAs, and report angle information on a per-path basis, in addition to values of other multipath signal characteristics through angle measurement requests, reporting, and capability signaling for multipath angle estimation and reporting for positioning. Aspects enable estimates of AoAs at a UE for multipath signals on a per-path basis by utilizing VAs, enable improvements of UE positioning accuracy by configuring for and reporting angle information per path, and provide for estimates of AoAs at a UE for multipath signals on a per-path basis using one antenna at reduced complexity and cost by utilizing a set of ToF values associated with the set of multipath signals, a UE location, or a VA location.

At 1002, the UE receives a set of multipath signals for a set of VAs, where each VA in the set of VAs is associated with a corresponding reflecting surface in a communication environment of the UE, where reflection of the set of multipath signals occurs via the corresponding reflecting surface associated with each VA in the set of VAs. As an example, the reception may be performed, at least in part, by one or more of the component 198, the transceiver(s) 1422, and/or the antenna 1480 in FIG. 14. FIG. 6 illustrates, in the context of FIGS. 5 and 7-9, an example of the UE 602 receiving such a set of multipath signals via reflection from a reflecting surface 606 associated with a set of VAs 608 based on a signal from a network entity (e.g., the network entity 604).

The UE 602 may be configured to transmit/provide, and the network entity 604 may be configured to receive, a capability indication (e.g., 816 in FIG. 8) that is indicative of a capability of the UE 602 to support a number of per-path angles (e.g., 713 in FIG. 7; 906, 908 in FIG. 9) for the set of multipath signals 614 (e.g., 712 in FIG. 7) for the set of VAs 608 (e.g., 708 in FIG. 7). The capability indication (e.g., 816 in FIG. 8) may include an angle information reporting capability field having a maximum supported value for the number of per-path angles (e.g., 713 in FIG. 7; 906, 908 in FIG. 9) that are supported by the UE 602 for the indication of the multipath information 618 (e.g., 732 in FIG. 7; 810 in FIG. 8; 902 in FIG. 9) associated with the set of multipath signals 614 (e.g., 712 in FIG. 7) for the set of VAs 608 (e.g., 708 in FIG. 7). In some aspects, the UE 602 may be configured to receive, and the network entity 604 may be configured to transmit/provide, a capability request (e.g., 812 in FIG. 8) that is indicative of the provision for the capability indication (e.g., 816 in FIG. 8). In such aspects, the UE 602 may be configured to provide the capability indication (e.g., 816 in FIG. 8) based on the capability request (e.g., 812 in FIG. 8). In aspects, the UE 602 may be configured to receive, and the network entity 604 may be configured to transmit/provide, a coordinate system configuration (e.g., 722 in FIG. 7). The coordinate system configuration (e.g., 722 in FIG. 7) may be indicative of a global coordinate system (e.g., 726 in FIG. 7) or of a local coordinate system (e.g., 720 in FIG. 7) associated with the UE 602. For example, the UE 602 may be configured to receive a global coordinate system (e.g., 726 in FIG. 7) configuration with the coordinate system configuration (e.g., 722 in FIG. 7), or may be configured to select a local coordinate system (e.g., 720 in FIG. 7) (e.g., that may be stored in at least one memory at the UE 602) based on the coordinate system configuration (e.g., 722 in FIG. 7). In one configuration, the UE 602 may be configured to receive, from the network entity 604, the global coordinate system (e.g., 726 in FIG. 7) configuration associated with the global coordinate system (e.g., 726 in FIG. 7), where the coordinate system configuration (e.g., 722 in FIG. 7) is indicative of the global coordinate system (e.g., 726 in FIG. 7). In another configuration, the UE 602 may be configured to select the local coordinate system (e.g., 720 in FIG. 7) associated with the UE 602, where the coordinate system configuration (e.g., 722 in FIG. 7) is indicative of the local coordinate system (e.g., 720 in FIG. 7). In aspects, the UE 602 may be configured to receive, and the network entity 604 may be configured to transmit/provide, a location information request (e.g., 806 in FIG. 8) in a first IE. The location information request (e.g., 806 in FIG. 8) may be indicative of an additional paths extension and a request for the provision of the multipath information (e.g., 732 in FIG. 7; 810 in FIG. 8; 902 in FIG. 9), associated with the set of multipath signals 614 (e.g., 712 in FIG. 7) for the set of VAs 608 (e.g., 708 in FIG. 7), that is indicated by the indication of multipath information 618 (e.g., 732 in FIG. 7; 810 in FIG. 8; 902 in FIG. 9), described herein.

In aspects, the UE 602 may be configured to receive, and the network entity 604 may be configured to transmit/provide, a signal 610 via a communication channel. The UE 602 may also be configured to receive, via a reflection 612 off of the reflecting surface 606 (e.g., 710 in FIG. 7) that is associated with the set of VAs 608 (e.g., 708 in FIG. 7), a set of multipath signals 614 (e.g., 712 in FIG. 7) that are based on the signal 610 transmitted/provided by the network entity 604 via the communication channel. In aspects, each VA in the set of VAs 608 (e.g., 708 in FIG. 7) may associated with a corresponding reflecting surface (e.g., the reflecting surface 606 (e.g., 710 in FIG. 7)) in a communication environment (e.g., 724, 730 in FIG. 7) of the UE 602, where the reflection 612 of the set of multipath signals 614 (e.g., 712 in FIG. 7) may correspondingly occur via the reflecting surface 606 associated with each VA in the set of VAs 608 (e.g., 708 in FIG. 7). In aspects, the UE 602 may be configured to receive the set of multipath signals 614 (e.g., 712 in FIG. 7) via at least one antenna (e.g., one of 706 in FIG. 7) (e.g., via a single antenna, via two or more antennas, etc.).

At 1004, the UE estimates at least one AoA associated with the set of multipath signals based on at least one of a set of ToF values associated with the set of multipath signals, a UE location, or a VA location. As an example, the estimation may be performed, at least in part, by one or more of the component 198, the transceiver(s) 1422, and/or the antenna 1480 in FIG. 14. FIG. 6 illustrates, in the context of FIGS. 5 and 7-9, an example of the UE 602 estimating such an AoA(s) associated with a set of multipath signals.

The UE 602 may be configured to estimate (at 616) at least one AoA (e.g., 713 in FIG. 7; 906, 908 in FIG. 9) associated with the set of multipath signals 614 (e.g., 712 in FIG. 7) based on at least one of a set of ToF values (e.g., 719 in FIG. 7) associated with the set of multipath signals 614 (e.g., 712 in FIG. 7), a UE location (e.g., of the UE 602), or a VA location of a VA in the set of VAs 608 (e.g., 708 in FIG. 7). In aspects, to estimate (at 616) the at least one AoA (e.g., 713 in FIG. 7; 906, 908 in FIG. 9) associated with the set of multipath signals 614 (e.g., 712 in FIG. 7), the UE 602 may be configured to obtain the set of ToF values (e.g., 719 in FIG. 7) associated with the set of multipath signals 614 (e.g., 712 in FIG. 7) based on at least one of the UE location or the VA location. In aspects, to obtain the set of ToF values (e.g., 719 in FIG. 7) associated with the set of multipath signals 614 (e.g., 712 in FIG. 7), the UE 602 may be configured to obtain or train an observation model associated with the set of VAs 608 (e.g., 708 in FIG. 7) based on at least one of the UE location or the VA location, and the UE 602 may be configured to obtain the set of ToF values (e.g., 719 in FIG. 7) associated with the set of multipath signals 614 (e.g., 712 in FIG. 7) based on the observation model associated with the set of VAs 608 (e.g., 708 in FIG. 7). In aspects, the UE 602 may be configured to receive the set of multipath signals 614 (e.g., 712 in FIG. 7) via at least one antenna (e.g., one of 706 in FIG. 7) (e.g., via a single antenna, via two or more antennas, etc.). In such aspects, the UE 602 may be configured to estimate (at 616) the at least one AoA (e.g., 713 in FIG. 7; 906, 908 in FIG. 9) associated with the set of multipath signals 614 (e.g., 712 in FIG. 7) received via the at least one antenna (e.g., via a single antenna (e.g., one of 706 in FIG. 7)).

At 1006, the UE provides, to a network entity, an indication of multipath information associated with the set of multipath signals for the set of VAs, where the multipath information includes the at least one AoA associated with at least one multipath signal in the set of multipath signals. As an example, the provision/transmission may be performed, at least in part, by one or more of the component 198, the transceiver(s) 1422, and/or the antenna 1480 in FIG. 14. FIG. 6 illustrates, in the context of FIGS. 5 and 7-9, an example of the UE 602 providing/transmitting such an indication of multipath information to a network entity (e.g., the network entity 604).

The UE 602 may be configured to transmit/provide, and the network entity 604 may be configured to receive, an indication of multipath information 618 (e.g., 732 in FIG. 7; 810 in FIG. 8; 902 in FIG. 9). The indication of multipath information 618 (e.g., 732 in FIG. 7; 810 in FIG. 8; 902 in FIG. 9) may be associated with the set of multipath signals 614 (e.g., 712 in FIG. 7) for the set of VAs 608 (e.g., 708 in FIG. 7), where the multipath information indicated by the indication of multipath information 618 (e.g., 732 in FIG. 7; 810 in FIG. 8; 902 in FIG. 9) may include at least one AoA (e.g., 713 in FIG. 7; 906, 908 in FIG. 9) associated with at least one multipath signal in the set of multipath signals 614 (e.g., 712 in FIG. 7). That is, for each additional reported path, the UE 602 may be configured to report, additionally, the angle (e.g., 713 in FIG. 7; 906, 908 in FIG. 9) of the path. In aspects, the UE 602 may be configured to provide, e.g., with or in addition to the indication of multipath information 618 (e.g., 732 in FIG. 7; 810 in FIG. 8; 902 in FIG. 9), a coordinate system configuration (e.g., 722 in FIG. 7) that may be indicative of a local coordinate system associated with a local environment (e.g., 724 in FIG. 7) the UE 602 or a global coordinate system associated with a global environment (e.g., 730 in FIG. 7). The at least one AoA (e.g., 713 in FIG. 7; 906, 908 in FIG. 9) associated with the multipath signal(s) in the set of multipath signals 614 (e.g., 712 in FIG. 7) may be associated with coordinates that correspond to the coordinate system configuration (e.g., 722 in FIG. 7) (e.g., either local or global).

The multipath information indicated by the indication of multipath information 618 (e.g., 732 in FIG. 7; 810 in FIG. 8; 902 in FIG. 9) may include a set of angle fields for an azimuthal angle and/or an elevational angle of the AoA(s) (e.g., 713 in FIG. 7; 906, 908 in FIG. 9) associated with the multipath signal(s) in the set of multipath signals 614 (e.g., 712 in FIG. 7). In aspects, one or more fields of the set of angle fields for the azimuthal angle and/or the elevational angle (e.g., 713 in FIG. 7; 906, 908 in FIG. 9) may include a respective set of integers associated with at least one of an angle value range or an angle decimal value range (e.g., 910, 912 in FIG. 9).

In aspects, the set of multipath signals 614 (e.g., 712 in FIG. 7) may include a first multipath signal and second multipath signal, where the first multipath signal is associated with a first AoA of the at least one AoA (e.g., 713 in FIG. 7; 906, 908 in FIG. 9) and the second multipath signal is associated with a second AoA of the at least one AoA. (e.g., 713 in FIG. 7; 906, 908 in FIG. 9) The first AoA is different from the second AoA, in aspects, and the respective set of integers for the second AOA may indicate a difference value from at least one of the angle value range or the angle decimal value range for the first AoA. Accordingly, an amount of data/information transmitted/provided for the indication of multipath information 618 (e.g., 732 in FIG. 7; 810 in FIG. 8; 902 in FIG. 9) may be reduced. The multipath information indicated by the indication of multipath information 618 (e.g., 732 in FIG. 7; 810 in FIG. 8; 902 in FIG. 9) may include a set of quality fields (e.g., 916, 918 in FIG. 9) for at least one quality estimate for the at least one AoA (e.g., 713 in FIG. 7; 906, 908 in FIG. 9) associated with the set of multipath signals 614 (e.g., 712 in FIG. 7). The set of quality fields (e.g., 916, 918 in FIG. 9) may include one or more angle fields corresponding to each multipath signal of the set of multipath signals 614 (e.g., 712 in FIG. 7), or may include one or more joint fields corresponding to associated pairs of AoAs and ToF values of the at least one AoA (e.g., 713 in FIG. 7; 906, 908 in FIG. 9) and the set of ToF values (e.g., 719 in FIG. 7).

In aspects, based on a reception of the location information request from the network entity 604, the UE 602 may be configured to transmit/provide the indication of multipath information 618 (e.g., 732 in FIG. 7; 810 in FIG. 8; 902 in FIG. 9) as a location information request response (e.g., 810 in FIG. 8) in a second IE and based on a threshold condition (e.g., at 808 in FIG. 8) associated with a RSRPP for each multipath signal in the set of multipath signals 614 (e.g., 712 in FIG. 7). In aspects, where an estimation (e.g., at 616) by the UE 602 is absent for an additional AoA (e.g., another of 713 in FIG. 7; another of 906, 908 in FIG. 9) associated with an additional multipath signal of the set of multipath signals 614 (e.g., 712 in FIG. 7), the UE 602 may be configured to include in the indication of multipath information 618 (e.g., 732 in FIG. 7; 810 in FIG. 8; 902 in FIG. 9) an indication (e.g., 906, 908 of 970 in FIG. 9), express or implicit, of the absence.

Figure 11:
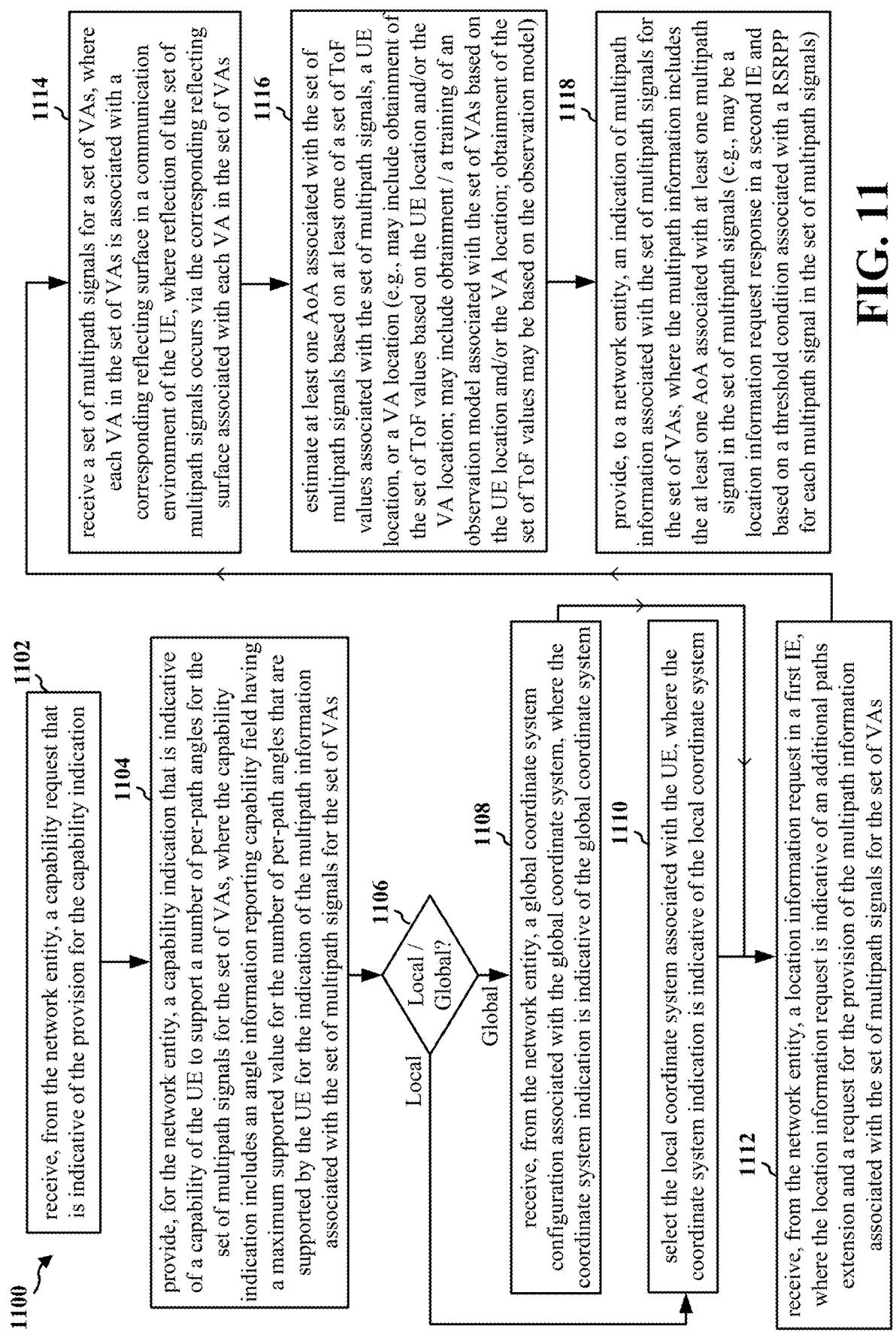
FIG. 11 is a flowchart of a method of wireless communication, in accordance with various aspects of the present disclosure.

FIG. 11 is a flowchart 1100 of a method of wireless communication. The method may be performed by a UE (e.g., the UE 104, 404, 602, 702, 802; the receiver 502; the apparatus 1404). In some aspects, the method may include aspects described in connection with the communication flow in FIG. 6 and/or aspects described in FIGS. 4, 5, 7, 8, 9. The method may be for multipath angle estimation and reporting for positioning. The method may enable a UE to receive a set of multipath signals, estimate associated AoAs based on a set of VAs, and report angle information on a per-path basis, in addition to values of other multipath signal characteristics through angle measurement requests, reporting, and capability signaling for multipath angle estimation and reporting for positioning. Aspects enable estimates of AoAs at a UE for multipath signals on a per-path basis by utilizing VAs, enable improvements of UE positioning accuracy by configuring for and reporting angle information per path, and provide for estimates of AoAs at a UE for multipath signals on a per-path basis using one antenna at reduced complexity and cost by utilizing a set of ToF values associated with the set of multipath signals, a UE location, or a VA location.

At 1102, the UE receives from the network entity, a capability request that is indicative of a provision for the capability indication. As an example, the reception may be performed, at least in part, by one or more of the component 198, the transceiver(s) 1422, and/or the antenna 1480 in FIG. 14. FIG. 6 illustrates, in the context of FIGS. 5 and 7-9, an example of the UE 602 receiving such a capability request from a network entity (e.g., the network entity 604).

In some aspects, the UE 602 may be configured to receive, and the network entity 604 may be configured to transmit/provide, a capability request (e.g., 812 in FIG. 8) that is indicative of the provision for the capability indication (e.g., 816 in FIG. 8). In such aspects, the UE 602 may be configured to provide the capability indication (e.g., 816 in FIG. 8) based on the capability request (e.g., 812 in FIG. 8).

At 1104, the UE provides, for the network entity, a capability indication that is indicative of a capability of the UE to support a number of per-path angles for the set of multipath signals for the set of VAs, where the capability indication includes an angle information reporting capability field having a maximum supported value for the number of per-path angles that are supported by the UE for the indication of the multipath information associated with the set of multipath signals for the set of VAs. As an example, the provision/transmission may be performed, at least in part, by one or more of the component 198, the transceiver(s) 1422, and/or the antenna 1480 in FIG. 14. FIG. 6 illustrates, in the context of FIGS. 5 and 7-9, an example of the UE 602 providing/transmitting such a capability indication to a network entity (e.g., the network entity 604).

The UE 602 may be configured to transmit/provide, and the network entity 604 may be configured to receive, a capability indication (e.g., 816 in FIG. 8) that is indicative of a capability of the UE 602 to support a number of per-path angles (e.g., 713 in FIG. 7; 906, 908 in FIG. 9) for the set of multipath signals 614 (e.g., 712 in FIG. 7) for the set of VAs 608 (e.g., 708 in FIG. 7). The capability indication (e.g., 816 in FIG. 8) may include an angle information reporting capability field having a maximum supported value for the number of per-path angles (e.g., 713 in FIG. 7; 906, 908 in FIG. 9) that are supported by the UE 602 for the indication of the multipath information 618 (e.g., 732 in FIG. 7; 810 in FIG. 8; 902 in FIG. 9) associated with the set of multipath signals 614 (e.g., 712 in FIG. 7) for the set of VAs 608 (e.g., 708 in FIG. 7).

At 1106, the UE determines if a local or a global coordinate system will be associated with angle estimation/reporting. As an example, the determination may be performed, at least in part, by one or more of the component 198, the transceiver(s) 1422, and/or the antenna 1480 in FIG. 14. If a global coordinate system is associated, the flowchart 1100 may continue to 1108; if a local coordinate system is associated, the flowchart 1100 may continue to 1110.

At 1108, the UE receives, from the network entity, a global coordinate system configuration associated with the global coordinate system, where the coordinate system indication is indicative of the global coordinate system. As an example, the reception may be performed, at least in part, by one or more of the component 198, the transceiver(s) 1422, and/or the antenna 1480 in FIG. 14. FIG. 6 illustrates, in the context of FIGS. 5 and 7-9, an example of the UE 602 receiving such a configuration from a network entity (e.g., the network entity 604).

In aspects, the UE 602 may be configured to receive, and the network entity 604 may be configured to transmit/provide, a coordinate system configuration (e.g., 722 in FIG. 7). The coordinate system configuration (e.g., 722 in FIG. 7) may be indicative of a global coordinate system (e.g., 726 in FIG. 7) or of a local coordinate system (e.g., 720 in FIG. 7) associated with the UE 602. For example, the UE 602 may be configured to receive a global coordinate system (e.g., 726 in FIG. 7) configuration with the coordinate system configuration (e.g., 722 in FIG. 7), or may be configured to select (e.g., at 728 in FIG. 7) a local coordinate system (e.g., 720 in FIG. 7) (e.g., that may be stored in at least one memory at the UE 602) based on the coordinate system configuration (e.g., 722 in FIG. 7). In one configuration, the UE 602 may be configured to receive, from the network entity 604, the global coordinate system (e.g., 726 in FIG. 7) configuration associated with the global coordinate system (e.g., 726 in FIG. 7), where the coordinate system configuration (e.g., 722 in FIG. 7) is indicative of the global coordinate system (e.g., 726 in FIG. 7). In another configuration, the UE 602 may be configured to select (e.g., at 728 in FIG. 7) the local coordinate system (e.g., 720 in FIG. 7) associated with the UE 602, where the coordinate system configuration (e.g., 722 in FIG. 7) is indicative of the local coordinate system (e.g., 720 in FIG. 7).

At 1110, the UE selects the local coordinate system associated with the UE, where the coordinate system indication is indicative of the local coordinate system. As an example, the selection may be performed, at least in part, by one or more of the component 198, the transceiver(s) 1422, and/or the antenna 1480 in FIG. 14. FIG. 6 illustrates, in the context of FIGS. 5 and 7-9, an example of the UE 602 selecting such a local coordinate system.

In aspects, the UE 602 may be configured to receive, and the network entity 604 may be configured to transmit/provide, a coordinate system configuration (e.g., 722 in FIG. 7). The coordinate system configuration (e.g., 722 in FIG. 7) may be indicative of a global coordinate system (e.g., 726 in FIG. 7) or of a local coordinate system (e.g., 720 in FIG. 7) associated with the UE 602. For example, the UE 602 may be configured to receive a global coordinate system (e.g., 726 in FIG. 7) configuration with the coordinate system configuration (e.g., 722 in FIG. 7), or may be configured to select (e.g., at 728 in FIG. 7) a local coordinate system (e.g., 720 in FIG. 7) (e.g., that may be stored in at least one memory at the UE 602) based on the coordinate system configuration (e.g., 722 in FIG. 7). In one configuration, the UE 602 may be configured to select (e.g., at 728 in FIG. 7) the local coordinate system (e.g., 720 in FIG. 7) associated with the UE 602, where the coordinate system configuration (e.g., 722 in FIG. 7) is indicative of the local coordinate system (e.g., 720 in FIG. 7).

At 1112, the UE receives, from the network entity, a location information request in a first IE, where the location information request is indicative of an additional paths extension and a request for the provision of the multipath information associated with the set of multipath signals for the set of VAs. As an example, the reception may be performed, at least in part, by one or more of the component 198, the transceiver(s) 1422, and/or the antenna 1480 in FIG. 14. FIG. 6 illustrates, in the context of FIGS. 5 and 7-9, an example of the UE 602 receiving such a location information request from a network entity (e.g., the network entity 604).

In aspects, the UE 602 may be configured to receive, and the network entity 604 may be configured to transmit/provide, a location information request (e.g., 806 in FIG. 8) in a first IE. The location information request (e.g., 806 in FIG. 8) may be indicative of an additional paths extension and a request for the provision of the multipath information (e.g., 732 in FIG. 7; 810 in FIG. 8; 902 in FIG. 9), associated with the set of multipath signals 614 (e.g., 712 in FIG. 7) for the set of VAs 608 (e.g., 708 in FIG. 7), that is indicated by the indication of multipath information 618 (e.g., 732 in FIG. 7; 810 in FIG. 8; 902 in FIG. 9), described herein.

At 1114, the UE receives a set of multipath signals for a set of VAs, where each VA in the set of VAs is associated with a corresponding reflecting surface in a communication environment of the UE, where reflection of the set of multipath signals occurs via the corresponding reflecting surface associated with each VA in the set of VAs. As an example, the reception may be performed, at least in part, by one or more of the component 198, the transceiver(s) 1422, and/or the antenna 1480 in FIG. 14. FIG. 6 illustrates, in the context of FIGS. 5 and 7-9, an example of the UE 602 receiving such a set of multipath signals via reflection from a reflecting surface 606 associated with a set of VAs 608 based on a signal from a network entity (e.g., the network entity 604).

In aspects, the UE 602 may be configured to receive, and the network entity 604 may be configured to transmit/provide, a signal 610 via a communication channel. The UE 602 may also be configured to receive, via a reflection 612 off of the reflecting surface 606 (e.g., 710 in FIG. 7) that is associated with the set of VAs 608 (e.g., 708 in FIG. 7), a set of multipath signals 614 (e.g., 712 in FIG. 7) that are based on the signal 610 transmitted/provided by the network entity 604 via the communication channel. In aspects, each VA in the set of VAs 608 (e.g., 708 in FIG. 7) may associated with a corresponding reflecting surface (e.g., the reflecting surface 606 (e.g., 710 in FIG. 7)) in a communication environment (e.g., 724, 730 in FIG. 7) of the UE 602, where the reflection 612 of the set of multipath signals 614 (e.g., 712 in FIG. 7) may correspondingly occur via the reflecting surface 606 associated with each VA in the set of VAs 608 (e.g., 708 in FIG. 7). In aspects, the UE 602 may be configured to receive the set of multipath signals 614 (e.g., 712 in FIG. 7) via at least one antenna (e.g., one of 706 in FIG. 7) (e.g., via a single antenna, via two or more antennas, etc.).

At 1116, the UE estimates at least one AoA associated with the set of multipath signals based on at least one of a set of ToF values associated with the set of multipath signals, a UE location, or a VA location. As an example, the estimation may be performed, at least in part, by one or more of the component 198, the transceiver(s) 1422, and/or the antenna 1480 in FIG. 14. FIG. 6 illustrates, in the context of FIGS. 5 and 7-9, an example of the UE 602 estimating such an AoA(s) associated with a set of multipath signals.

The UE 602 may be configured to estimate (at 616) at least one AoA (e.g., 713 in FIG. 7; 906, 908 in FIG. 9) associated with the set of multipath signals 614 (e.g., 712 in FIG. 7) based on at least one of a set of ToF values (e.g., 719 in FIG. 7) associated with the set of multipath signals 614 (e.g., 712 in FIG. 7), a UE location (e.g., of the UE 602), or a VA location of a VA in the set of VAs 608 (e.g., 708 in FIG. 7). In aspects, to estimate (at 616) the at least one AoA (e.g., 713 in FIG. 7; 906, 908 in FIG. 9) associated with the set of multipath signals 614 (e.g., 712 in FIG. 7), the UE 602 may be configured to obtain the set of ToF values (e.g., 719 in FIG. 7) associated with the set of multipath signals 614 (e.g., 712 in FIG. 7) based on at least one of the UE location or the VA location. In aspects, to obtain the set of ToF values (e.g., 719 in FIG. 7) associated with the set of multipath signals 614 (e.g., 712 in FIG. 7), the UE 602 may be configured to obtain or train an observation model associated with the set of VAs 608 (e.g., 708 in FIG. 7) based on at least one of the UE location or the VA location, and the UE 602 may be configured to obtain the set of ToF values (e.g., 719 in FIG. 7) associated with the set of multipath signals 614 (e.g., 712 in FIG. 7) based on the observation model associated with the set of VAs 608 (e.g., 708 in FIG. 7). In aspects, the UE 602 may be configured to receive the set of multipath signals 614 (e.g., 712 in FIG. 7) via at least one antenna (e.g., one of 706 in FIG. 7) (e.g., via a single antenna, via two or more antennas, etc.). In such aspects, the UE 602 may be configured to estimate (at 616) the at least one AoA (e.g., 713 in FIG. 7; 906, 908 in FIG. 9) associated with the set of multipath signals 614 (e.g., 712 in FIG. 7) received via the at least one antenna (e.g., via a single antenna (e.g., one of 706 in FIG. 7)).

At 1118, the UE provides, to a network entity, an indication of multipath information associated with the set of multipath signals for the set of VAs, where the multipath information includes the at least one AoA associated with at least one multipath signal in the set of multipath signals. As an example, the provision/transmission may be performed, at least in part, by one or more of the component 198, the transceiver(s) 1422, and/or the antenna 1480 in FIG. 14. FIG. 6 illustrates, in the context of FIGS. 5 and 7-9, an example of the UE 602 providing/transmitting such an indication of multipath information to a network entity (e.g., the network entity 604).

The UE 602 may be configured to transmit/provide, and the network entity 604 may be configured to receive, an indication of multipath information 618 (e.g., 732 in FIG. 7; 810 in FIG. 8; 902 in FIG. 9). The indication of multipath information 618 (e.g., 732 in FIG. 7; 810 in FIG. 8; 902 in FIG. 9) may be associated with the set of multipath signals 614 (e.g., 712 in FIG. 7) for the set of VAs 608 (e.g., 708 in FIG. 7), where the multipath information indicated by the indication of multipath information 618 (e.g., 732 in FIG. 7; 810 in FIG. 8; 902 in FIG. 9) may include at least one AoA (e.g., 713 in FIG. 7; 906, 908 in FIG. 9) associated with at least one multipath signal in the set of multipath signals 614 (e.g., 712 in FIG. 7). That is, for each additional reported path, the UE 602 may be configured to report, additionally, the angle (e.g., 713 in FIG. 7; 906, 908 in FIG. 9) of the path. In aspects, the UE 602 may be configured to provide, e.g., with or in addition to the indication of multipath information 618 (e.g., 732 in FIG. 7; 810 in FIG. 8; 902 in FIG. 9), a coordinate system configuration (e.g., 722 in FIG. 7) that may be indicative of a local coordinate system associated with a local environment (e.g., 724 in FIG. 7) the UE 602 or a global coordinate system associated with a global environment (e.g., 730 in FIG. 7). The at least one AoA (e.g., 713 in FIG. 7; 906, 908 in FIG. 9) associated with the multipath signal(s) in the set of multipath signals 614 (e.g., 712 in FIG. 7) may be associated with coordinates that correspond to the coordinate system configuration (e.g., 722 in FIG. 7) (e.g., either local or global).

The multipath information indicated by the indication of multipath information 618 (e.g., 732 in FIG. 7; 810 in FIG. 8; 902 in FIG. 9) may include a set of angle fields for an azimuthal angle and/or an elevational angle of the AoA(s) (e.g., 713 in FIG. 7; 906, 908 in FIG. 9) associated with the multipath signal(s) in the set of multipath signals 614 (e.g., 712 in FIG. 7). In aspects, one or more fields of the set of angle fields for the azimuthal angle and/or the elevational angle (e.g., 713 in FIG. 7; 906, 908 in FIG. 9) may include a respective set of integers associated with at least one of an angle value range or an angle decimal value range (e.g., 910, 912 in FIG. 9).

In aspects, the set of multipath signals 614 (e.g., 712 in FIG. 7) may include a first multipath signal and second multipath signal, where the first multipath signal is associated with a first AoA of the at least one AoA (e.g., 713 in FIG. 7; 906, 908 in FIG. 9) and the second multipath signal is associated with a second AoA of the at least one AoA. (e.g., 713 in FIG. 7; 906, 908 in FIG. 9) The first AoA is different from the second AoA, in aspects, and the respective set of integers for the second AOA may indicate a difference value from at least one of the angle value range or the angle decimal value range for the first AoA. Accordingly, an amount of data/information transmitted/provided for the indication of multipath information 618 (e.g., 732 in FIG. 7; 810 in FIG. 8; 902 in FIG. 9) may be reduced. The multipath information indicated by the indication of multipath information 618 (e.g., 732 in FIG. 7; 810 in FIG. 8; 902 in FIG. 9) may include a set of quality fields (e.g., 916, 918 in FIG. 9) for at least one quality estimate for the at least one AoA (e.g., 713 in FIG. 7; 906, 908 in FIG. 9) associated with the set of multipath signals 614 (e.g., 712 in FIG. 7). The set of quality fields (e.g., 916, 918 in FIG. 9) may include one or more angle fields corresponding to each multipath signal of the set of multipath signals 614 (e.g., 712 in FIG. 7), or may include one or more joint fields corresponding to associated pairs of AoAs and ToF values of the at least one AoA (e.g., 713 in FIG. 7; 906, 908 in FIG. 9) and the set of ToF values (e.g., 719 in FIG. 7).

In aspects, based on a reception of the location information request from the network entity 604, the UE 602 may be configured to transmit/provide the indication of multipath information 618 (e.g., 732 in FIG. 7; 810 in FIG. 8; 902 in FIG. 9) as a location information request response (e.g., 810 in FIG. 8) in a second IE and based on a threshold condition (e.g., at 808 in FIG. 8) associated with a RSRPP for each multipath signal in the set of multipath signals 614 (e.g., 712 in FIG. 7). In aspects, where an estimation (e.g., at 616) by the UE 602 is absent for an additional AoA (e.g., another of 713 in FIG. 7; another of 906, 908 in FIG. 9) associated with an additional multipath signal of the set of multipath signals 614 (e.g., 712 in FIG. 7), the UE 602 may be configured to include in the indication of multipath information 618 (e.g., 732 in FIG. 7; 810 in FIG. 8; 902 in FIG. 9) an indication (e.g., 906, 908 of 970 in FIG. 9), express or implicit, of the absence.

Figure 12:
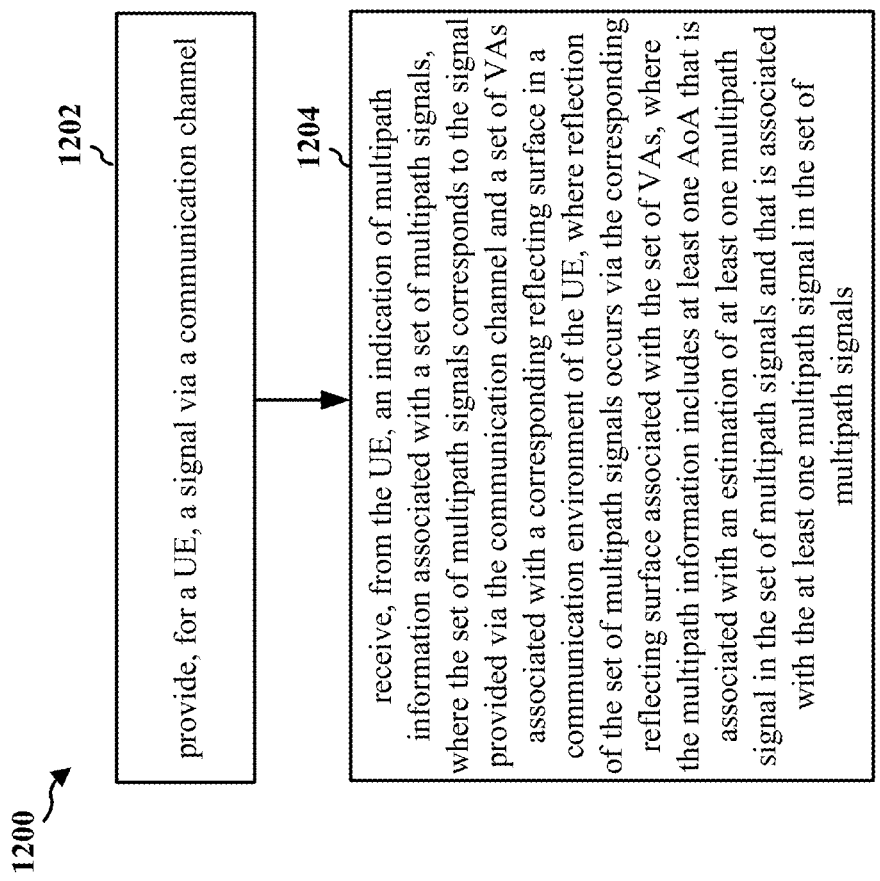
FIG. 12 is a flowchart of a method of wireless communication, in accordance with various aspects of the present disclosure.

FIG. 12 is a flowchart 1200 of a method of wireless communication. The method may be performed by a network entity (e.g., the base station 102; the transmitter 522; the network entity 604, 704, 804, 1402, 1502, 1660). In some aspects, the method may include aspects described in connection with the communication flow in FIG. 6 and/or aspects described in FIGS. 4, 5, 7, 8, 9. The method may be for multipath angle estimation and reporting for positioning. The method may enable a UE to receive a set of multipath signals, estimate associated AoAs based on a set of VAs, and report angle information on a per-path basis, in addition to values of other multipath signal characteristics through angle measurement requests, reporting, and capability signaling for multipath angle estimation and reporting for positioning. Aspects enable estimates of AoAs at a UE for multipath signals on a per-path basis by utilizing VAs, enable improvements of UE positioning accuracy by configuring for and reporting angle information per path, and provide for estimates of AoAs at a UE for multipath signals on a per-path basis using one antenna at reduced complexity and cost by utilizing a set of ToF values associated with the set of multipath signals, a UE location, or a VA location.

At 1202, the network entity provides, for a UE, a signal via a communication channel. As an example, the provision/transmission may be performed, at least in part, by one or more of the component 199, the transceiver(s) 1546, and/or the antenna(s) 1580 in FIG. 15; the component 199, the network interface 1680 in FIG. 16. FIG. 6 illustrates, in the context of FIGS. 5 and 7-9, an example of the network entity 604 providing/transmitting such a signal for a UE (e.g., the UE 602).

In aspects, the UE 602 may be configured to receive, and the network entity 604 may be configured to transmit/provide, a signal 610 via a communication channel. The UE 602 may also be configured to receive, via a reflection 612 off of the reflecting surface 606 (e.g., 710 in FIG. 7) that is associated with the set of VAs 608 (e.g., 708 in FIG. 7), a set of multipath signals 614 (e.g., 712 in FIG. 7) that are based on the signal 610 transmitted/provided by the network entity 604 via the communication channel.

At 1204, the network entity receives, from the UE, an indication of multipath information associated with a set of multipath signals, where the set of multipath signals corresponds to the signal provided via the communication channel and a set of VAs associated with a corresponding reflecting surface in a communication environment of the UE, where reflection of the set of multipath signals occurs via the corresponding reflecting surface associated with the set of VAs, where the multipath information includes at least one AoA that is associated with an estimation of at least one multipath signal in the set of multipath signals and that is associated with the at least one multipath signal in the set of multipath signals. As an example, the reception may be performed, at least in part, by one or more of the component 199, the transceiver(s) 1546, and/or the antenna(s) 1580 in FIG. 15; the component 199, the network interface 1680 in FIG. 16. FIG. 6 illustrates, in the context of FIGS. 5 and 7-9, an example of the network entity 604 receiving such an indication of multipath information from a UE (e.g., the UE 602).

In aspects, each VA in the set of VAs 608 (e.g., 708 in FIG. 7) may associated with a corresponding reflecting surface (e.g., the reflecting surface 606 (e.g., 710 in FIG. 7)) in a communication environment (e.g., 724, 730 in FIG. 7) of the UE 602, where the reflection 612 of the set of multipath signals 614 (e.g., 712 in FIG. 7) may correspondingly occur via the reflecting surface 606 associated with each VA in the set of VAs 608 (e.g., 708 in FIG. 7). In aspects, the UE 602 may be configured to receive the set of multipath signals 614 (e.g., 712 in FIG. 7) via at least one antenna (e.g., one of 706 in FIG. 7) (e.g., via a single antenna, via two or more antennas, etc.). The UE 602 may be configured to estimate (at 616) at least one AoA (e.g., 713 in FIG. 7; 906, 908 in FIG. 9) associated with the set of multipath signals 614 (e.g., 712 in FIG. 7) based on at least one of a set of ToF values (e.g., 719 in FIG. 7) associated with the set of multipath signals 614 (e.g., 712 in FIG. 7), a UE location (e.g., of the UE 602), or a VA location of a VA in the set of VAs 608 (e.g., 708 in FIG. 7). In aspects, to estimate (at 616) the at least one AoA (e.g., 713 in FIG. 7; 906, 908 in FIG. 9) associated with the set of multipath signals 614 (e.g., 712 in FIG. 7), the UE 602 may be configured to obtain the set of ToF values (e.g., 719 in FIG. 7) associated with the set of multipath signals 614 (e.g., 712 in FIG. 7) based on at least one of the UE location or the VA location. In aspects, to obtain the set of ToF values (e.g., 719 in FIG. 7) associated with the set of multipath signals 614 (e.g., 712 in FIG. 7), the UE 602 may be configured to obtain or train an observation model associated with the set of VAs 608 (e.g., 708 in FIG. 7) based on at least one of the UE location or the VA location, and the UE 602 may be configured to obtain the set of ToF values (e.g., 719 in FIG. 7) associated with the set of multipath signals 614 (e.g., 712 in FIG. 7) based on the observation model associated with the set of VAs 608 (e.g., 708 in FIG. 7). In aspects, the UE 602 may be configured to receive the set of multipath signals 614 (e.g., 712 in FIG. 7) via at least one antenna (e.g., one of 706 in FIG. 7) (e.g., via a single antenna, via two or more antennas, etc.). In such aspects, the UE 602 may be configured to estimate (at 616) the at least one AoA (e.g., 713 in FIG. 7; 906, 908 in FIG. 9) associated with the set of multipath signals 614 (e.g., 712 in FIG. 7) received via the at least one antenna (e.g., via a single antenna, one of 706 in FIG. 7)). The UE 602 may be configured to transmit/provide, and the network entity 604 may be configured to receive, an indication of multipath information 618 (e.g., 732 in FIG. 7; 810 in FIG. 8; 902 in FIG. 9). The indication of multipath information 618 (e.g., 732 in FIG. 7; 810 in FIG. 8; 902 in FIG. 9) may be associated with the set of multipath signals 614 (e.g., 712 in FIG. 7) for the set of VAs 608 (e.g., 708 in FIG. 7), where the multipath information indicated by the indication of multipath information 618 (e.g., 732 in FIG. 7; 810 in FIG. 8; 902 in FIG. 9) may include at least one AoA (e.g., 713 in FIG. 7; 906, 908 in FIG. 9) associated with at least one multipath signal in the set of multipath signals 614 (e.g., 712 in FIG. 7). That is, for each additional reported path, the UE 602 may be configured to report, additionally, the angle (e.g., 713 in FIG. 7; 906, 908 in FIG. 9) of the path. In aspects, the UE 602 may be configured to provide, e.g., with or in addition to the indication of multipath information 618 (e.g., 732 in FIG. 7; 810 in FIG. 8; 902 in FIG. 9), a coordinate system configuration (e.g., 722 in FIG. 7) that may be indicative of a local coordinate system associated with a local environment (e.g., 724 in FIG. 7) the UE 602 or a global coordinate system associated with a global environment (e.g., 730 in FIG. 7). The at least one AoA (e.g., 713 in FIG. 7; 906, 908 in FIG. 9) associated with the multipath signal(s) in the set of multipath signals 614 (e.g., 712 in FIG. 7) may be associated with coordinates that correspond to the coordinate system configuration (e.g., 722 in FIG. 7) (e.g., either local or global).

The multipath information indicated by the indication of multipath information 618 (e.g., 732 in FIG. 7; 810 in FIG. 8; 902 in FIG. 9) may include a set of angle fields for an azimuthal angle and/or an elevational angle of the AoA(s) (e.g., 713 in FIG. 7; 906, 908 in FIG. 9) associated with the multipath signal(s) in the set of multipath signals 614 (e.g., 712 in FIG. 7). In aspects, one or more fields of the set of angle fields for the azimuthal angle and/or the elevational angle (e.g., 713 in FIG. 7; 906, 908 in FIG. 9) may include a respective set of integers associated with at least one of an angle value range or an angle decimal value range (e.g., 910, 912 in FIG. 9).

In aspects, the set of multipath signals 614 (e.g., 712 in FIG. 7) may include a first multipath signal and second multipath signal, where the first multipath signal is associated with a first AoA of the at least one AoA (e.g., 713 in FIG. 7; 906, 908 in FIG. 9) and the second multipath signal is associated with a second AoA of the at least one AoA. (e.g., 713 in FIG. 7; 906, 908 in FIG. 9) The first AoA is different from the second AoA, in aspects, and the respective set of integers for the second AOA may indicate a difference value from at least one of the angle value range or the angle decimal value range for the first AoA. Accordingly, an amount of data/information transmitted/provided for the indication of multipath information 618 (e.g., 732 in FIG. 7; 810 in FIG. 8; 902 in FIG. 9) may be reduced. The multipath information indicated by the indication of multipath information 618 (e.g., 732 in FIG. 7; 810 in FIG. 8; 902 in FIG. 9) may include a set of quality fields (e.g., 916, 918 in FIG. 9) for at least one quality estimate for the at least one AoA (e.g., 713 in FIG. 7; 906, 908 in FIG. 9) associated with the set of multipath signals 614 (e.g., 712 in FIG. 7). The set of quality fields (e.g., 916, 918 in FIG. 9) may include one or more angle fields corresponding to each multipath signal of the set of multipath signals 614 (e.g., 712 in FIG. 7), or may include one or more joint fields corresponding to associated pairs of AoAs and ToF values of the at least one AoA (e.g., 713 in FIG. 7; 906, 908 in FIG. 9) and the set of ToF values (e.g., 719 in FIG. 7).

In aspects, based on a reception of the location information request from the network entity 604, the UE 602 may be configured to transmit/provide the indication of multipath information 618 (e.g., 732 in FIG. 7; 810 in FIG. 8; 902 in FIG. 9) as a location information request response (e.g., 810 in FIG. 8) in a second IE and based on a threshold condition (e.g., at 808 in FIG. 8) associated with a RSRPP for each multipath signal in the set of multipath signals 614 (e.g., 712 in FIG. 7). In aspects, where an estimation (e.g., at 616) by the UE 602 is absent for an additional AoA (e.g., another of 713 in FIG. 7; another of 906, 908 in FIG. 9) associated with an additional multipath signal of the set of multipath signals 614 (e.g., 712 in FIG. 7), the UE 602 may be configured to include in the indication of multipath information 618 (e.g., 732 in FIG. 7; 810 in FIG. 8; 902 in FIG. 9) an indication (e.g., 906, 908 of 970 in FIG. 9), express or implicit, of the absence.

Figure 13:
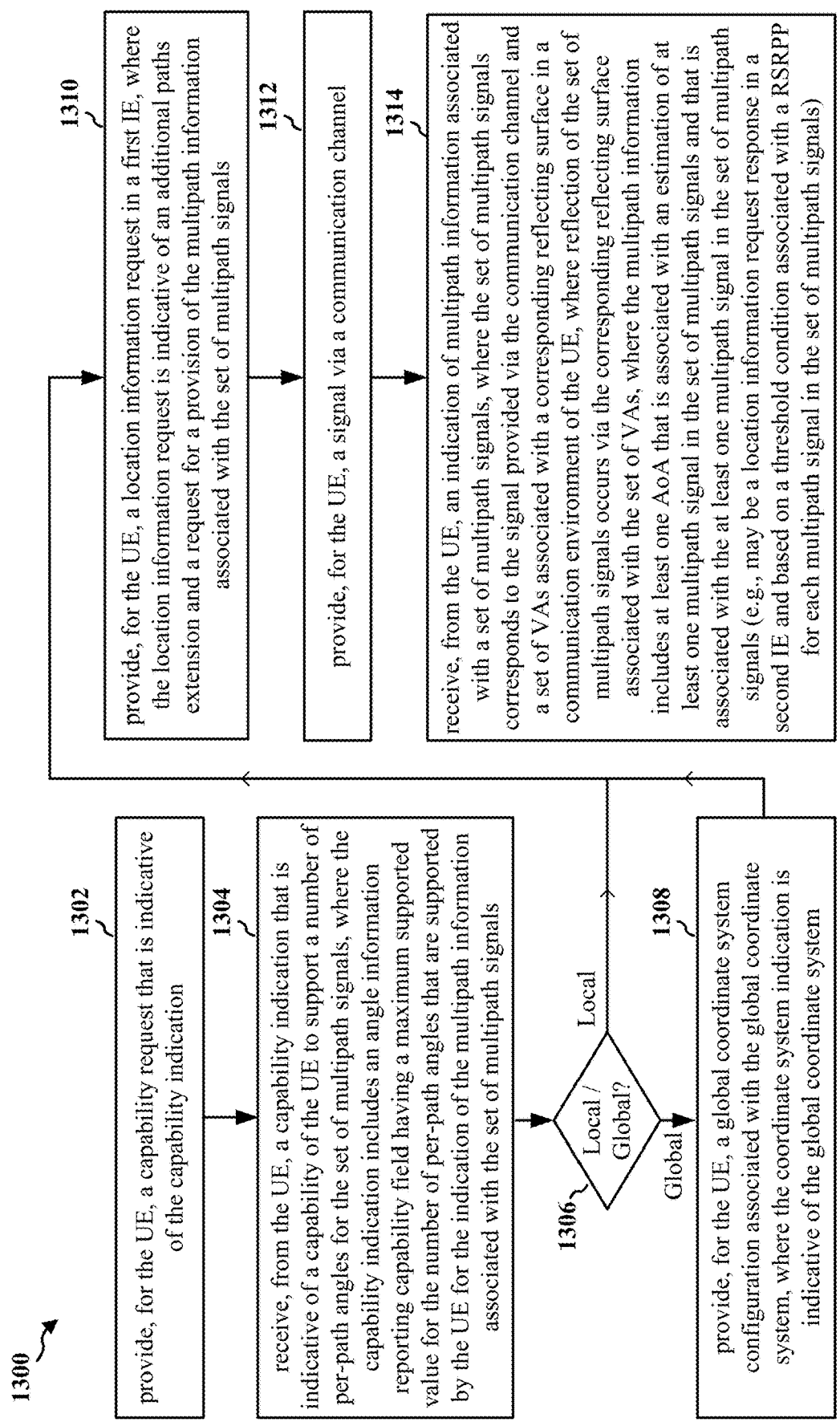
FIG. 13 is a flowchart of a method of wireless communication, in accordance with various aspects of the present disclosure.

FIG. 13 is a flowchart 1300 of a method of wireless communication. The method may be performed by a network entity (e.g., the base station 102; the transmitter 522; the network entity 604, 704, 804, 1402, 1502, 1660). In some aspects, the method may include aspects described in connection with the communication flow in FIG. 6 and/or aspects described in FIGS. 4, 5, 7, 8, 9. The method may be for multipath angle estimation and reporting for positioning. The method may enable a UE to receive a set of multipath signals, estimate associated AoAs based on a set of VAs, and report angle information on a per-path basis, in addition to values of other multipath signal characteristics through angle measurement requests, reporting, and capability signaling for multipath angle estimation and reporting for positioning. Aspects enable estimates of AoAs at a UE for multipath signals on a per-path basis by utilizing VAs, enable improvements of UE positioning accuracy by configuring for and reporting angle information per path, and provide for estimates of AoAs at a UE for multipath signals on a per-path basis using one antenna at reduced complexity and cost by utilizing a set of ToF values associated with the set of multipath signals, a UE location, or a VA location.

At 1302, the network entity provides, for a UE, a capability request that is indicative of the capability indication. As an example, the provision/transmission may be performed, at least in part, by one or more of the component 199, the transceiver(s) 1546, and/or the antenna(s) 1580 in FIG. 15; the component 199, the network interface 1680 in FIG. 16. FIG. 6 illustrates, in the context of FIGS. 5 and 7-9, an example of the network entity 604 providing/transmitting such a capability request for a UE (e.g., the UE 602).

In some aspects, the UE 602 may be configured to receive, and the network entity 604 may be configured to transmit/provide, a capability request (e.g., 812 in FIG. 8) that is indicative of the provision for the capability indication (e.g., 816 in FIG. 8). In such aspects, the UE 602 may be configured to provide the capability indication (e.g., 816 in FIG. 8) based on the capability request (e.g., 812 in FIG. 8).

At 1304, the network entity receives, from the UE, a capability indication that is indicative of a capability of the UE to support a number of per-path angles for the set of multipath signals, where the capability indication includes an angle information reporting capability field having a maximum supported value for the number of per-path angles that are supported by the UE for the indication of the multipath information associated with the set of multipath signals. As an example, the reception may be performed, at least in part, by one or more of the component 199, the transceiver(s) 1546, and/or the antenna(s) 1580 in FIG. 15; the component 199, the network interface 1680 in FIG. 16. FIG. 6 illustrates, in the context of FIGS. 5 and 7-9, an example of the network entity 604 receiving such a capability indication from a UE (e.g., the UE 602).

The UE 602 may be configured to transmit/provide, and the network entity 604 may be configured to receive, a capability indication (e.g., 816 in FIG. 8) that is indicative of a capability of the UE 602 to support a number of per-path angles (e.g., 713 in FIG. 7; 906, 908 in FIG. 9) for the set of multipath signals 614 (e.g., 712 in FIG. 7) for the set of VAs 608 (e.g., 708 in FIG. 7). The capability indication (e.g., 816 in FIG. 8) may include an angle information reporting capability field having a maximum supported value for the number of per-path angles (e.g., 713 in FIG. 7; 906, 908 in FIG. 9) that are supported by the UE 602 for the indication of the multipath information 618 (e.g., 732 in FIG. 7; 810 in FIG. 8; 902 in FIG. 9) associated with the set of multipath signals 614 (e.g., 712 in FIG. 7) for the set of VAs 608 (e.g., 708 in FIG. 7).

At 1306, the network entity determines if a local or a global coordinate system will be associated with angle estimation/reporting. As an example, the determination may be performed, at least in part, by one or more of the component 199, the transceiver(s) 1546, and/or the antenna(s) 1580 in FIG. 15; the component 199, the network interface 1680 in FIG. 16. If a global coordinate system is associated, the flowchart 1300 may continue to 1308; if a local coordinate system is associated, the flowchart 1300 may continue to 1310.

At 1308, the network entity provides, for the UE, a global coordinate system configuration associated with the global coordinate system, where the coordinate system indication is indicative of the global coordinate system. As an example, the provision/transmission may be performed, at least in part, by one or more of the component 199, the transceiver(s) 1546, and/or the antenna(s) 1580 in FIG. 15; the component 199, the network interface 1680 in FIG. 16. FIG. 6 illustrates, in the context of FIGS. 5 and 7-9, an example of the network entity 604 providing/transmitting such a configuration for a UE (e.g., the UE 602).

In aspects, the UE 602 may be configured to receive, and the network entity 604 may be configured to transmit/provide, a coordinate system configuration (e.g., 722 in FIG. 7). The coordinate system configuration (e.g., 722 in FIG. 7) may be indicative of a global coordinate system (e.g., 726 in FIG. 7) or of a local coordinate system (e.g., 720 in FIG. 7) associated with the UE 602. For example, the UE 602 may be configured to receive a global coordinate system (e.g., 726 in FIG. 7) configuration with the coordinate system configuration (e.g., 722 in FIG. 7), or may be configured to select a local coordinate system (e.g., 720 in FIG. 7) (e.g., that may be stored in at least one memory at the UE 602) based on the coordinate system configuration (e.g., 722 in FIG. 7). In one configuration, the UE 602 may be configured to receive, from the network entity 604, the global coordinate system (e.g., 726 in FIG. 7) configuration associated with the global coordinate system (e.g., 726 in FIG. 7), where the coordinate system configuration (e.g., 722 in FIG. 7) is indicative of the global coordinate system (e.g., 726 in FIG. 7). In another configuration, the UE 602 may be configured to select the local coordinate system (e.g., 720 in FIG. 7) associated with the UE 602, where the coordinate system configuration (e.g., 722 in FIG. 7) is indicative of the local coordinate system (e.g., 720 in FIG. 7).

At 1310, the network entity provides, for the UE, a location information request in a first IE, where the location information request is indicative of an additional paths extension and a request for the provision of the multipath information associated with the set of multipath signals. As an example, the provision/transmission may be performed, at least in part, by one or more of the component 199, the transceiver(s) 1546, and/or the antenna(s) 1580 in FIG. 15; the component 199, the network interface 1680 in FIG. 16. FIG. 6 illustrates, in the context of FIGS. 5 and 7-9, an example of the network entity 604 providing/transmitting such a location information request for a UE (e.g., the UE 602).

In aspects, the UE 602 may be configured to receive, and the network entity 604 may be configured to transmit/provide, a location information request (e.g., 806 in FIG. 8) in a first IE. The location information request (e.g., 806 in FIG. 8) may be indicative of an additional paths extension and a request for the provision of the multipath information (e.g., 732 in FIG. 7; 810 in FIG. 8; 902 in FIG. 9), associated with the set of multipath signals 614 (e.g., 712 in FIG. 7) for the set of VAs 608 (e.g., 708 in FIG. 7), that is indicated by the indication of multipath information 618 (e.g., 732 in FIG. 7; 810 in FIG. 8; 902 in FIG. 9), described herein.

At 1312, the network entity provides, for a UE, a signal via a communication channel. As an example, the provision/transmission may be performed, at least in part, by one or more of the component 199, the transceiver(s) 1546, and/or the antenna(s) 1580 in FIG. 15; the component 199, the network interface 1680 in FIG. 16. FIG. 6 illustrates, in the context of FIGS. 5 and 7-9, an example of the network entity 604 providing/transmitting such a signal for a UE (e.g., the UE 602).

In aspects, the UE 602 may be configured to receive, and the network entity 604 may be configured to transmit/provide, a signal 610 via a communication channel. The UE 602 may also be configured to receive, via a reflection 612 off of the reflecting surface 606 (e.g., 710 in FIG. 7) that is associated with the set of VAs 608 (e.g., 708 in FIG. 7), a set of multipath signals 614 (e.g., 712 in FIG. 7) that are based on the signal 610 transmitted/provided by the network entity 604 via the communication channel.

At 1314, the network entity receives, from the UE, an indication of multipath information associated with a set of multipath signals, where the set of multipath signals corresponds to the signal provided via the communication channel and a set of VAs associated with a corresponding reflecting surface in a communication environment of the UE, where reflection of the set of multipath signals occurs via the corresponding reflecting surface associated with the set of VAs, where the multipath information includes at least one AoA that is associated with an estimation of at least one multipath signal in the set of multipath signals and that is associated with the at least one multipath signal in the set of multipath signals. As an example, the reception may be performed, at least in part, by one or more of the component 199, the transceiver(s) 1546, and/or the antenna(s) 1580 in FIG. 15; the component 199, the network interface 1680 in FIG. 16. FIG. 6 illustrates, in the context of FIGS. 5 and 7-9, an example of the network entity 604 receiving such an indication of multipath information from a UE (e.g., the UE 602).

In aspects, each VA in the set of VAs 608 (e.g., 708 in FIG. 7) may associated with a corresponding reflecting surface (e.g., the reflecting surface 606 (e.g., 710 in FIG. 7)) in a communication environment (e.g., 724, 730 in FIG. 7) of the UE 602, where the reflection 612 of the set of multipath signals 614 (e.g., 712 in FIG. 7) may correspondingly occur via the reflecting surface 606 associated with each VA in the set of VAs 608 (e.g., 708 in FIG. 7). In aspects, the UE 602 may be configured to receive the set of multipath signals 614 (e.g., 712 in FIG. 7) via at least one antenna (e.g., one of 706 in FIG. 7) (e.g., via a single antenna, via two or more antennas, etc.). The UE 602 may be configured to estimate (at 616) at least one AoA (e.g., 713 in FIG. 7; 906, 908 in FIG. 9) associated with the set of multipath signals 614 (e.g., 712 in FIG. 7) based on at least one of a set of ToF values (e.g., 719 in FIG. 7) associated with the set of multipath signals 614 (e.g., 712 in FIG. 7), a UE location (e.g., of the UE 602), or a VA location of a VA in the set of VAs 608 (e.g., 708 in FIG. 7). In aspects, to estimate (at 616) the at least one AoA (e.g., 713 in FIG. 7; 906, 908 in FIG. 9) associated with the set of multipath signals 614 (e.g., 712 in FIG. 7), the UE 602 may be configured to obtain the set of ToF values (e.g., 719 in FIG. 7) associated with the set of multipath signals 614 (e.g., 712 in FIG. 7) based on at least one of the UE location or the VA location. In aspects, to obtain the set of ToF values (e.g., 719 in FIG. 7) associated with the set of multipath signals 614 (e.g., 712 in FIG. 7), the UE 602 may be configured to obtain or train an observation model associated with the set of VAs 608 (e.g., 708 in FIG. 7) based on at least one of the UE location or the VA location, and the UE 602 may be configured to obtain the set of ToF values (e.g., 719 in FIG. 7) associated with the set of multipath signals 614 (e.g., 712 in FIG. 7) based on the observation model associated with the set of VAs 608 (e.g., 708 in FIG. 7). In aspects, the UE 602 may be configured to receive the set of multipath signals 614 (e.g., 712 in FIG. 7) via at least one antenna (e.g., one of 706 in FIG. 7) (e.g., via a single antenna, via two or more antennas, etc.). In such aspects, the UE 602 may be configured to estimate (at 616) the at least one AoA (e.g., 713 in FIG. 7; 906, 908 in FIG. 9) associated with the set of multipath signals 614 (e.g., 712 in FIG. 7) received via the at least one antenna (e.g., via a single antenna (e.g., one of 706 in FIG. 7)). The UE 602 may be configured to transmit/provide, and the network entity 604 may be configured to receive, an indication of multipath information 618 (e.g., 732 in FIG. 7; 810 in FIG. 8; 902 in FIG. 9). The indication of multipath information 618 (e.g., 732 in FIG. 7; 810 in FIG. 8; 902 in FIG. 9) may be associated with the set of multipath signals 614 (e.g., 712 in FIG. 7) for the set of VAs 608 (e.g., 708 in FIG. 7), where the multipath information indicated by the indication of multipath information 618 (e.g., 732 in FIG. 7; 810 in FIG. 8; 902 in FIG. 9) may include at least one AoA (e.g., 713 in FIG. 7; 906, 908 in FIG. 9) associated with at least one multipath signal in the set of multipath signals 614 (e.g., 712 in FIG. 7). That is, for each additional reported path, the UE 602 may be configured to report, additionally, the angle (e.g., 713 in FIG. 7; 906, 908 in FIG. 9) of the path. In aspects, the UE 602 may be configured to provide, e.g., with or in addition to the indication of multipath information 618 (e.g., 732 in FIG. 7; 810 in FIG. 8; 902 in FIG. 9), a coordinate system configuration (e.g., 722 in FIG. 7) that may be indicative of a local coordinate system associated with a local environment (e.g., 724 in FIG. 7) the UE 602 or a global coordinate system associated with a global environment (e.g., 730 in FIG. 7). The at least one AoA (e.g., 713 in FIG. 7; 906, 908 in FIG. 9) associated with the multipath signal(s) in the set of multipath signals 614 (e.g., 712 in FIG. 7) may be associated with coordinates that correspond to the coordinate system configuration (e.g., 722 in FIG. 7) (e.g., either local or global).

The multipath information indicated by the indication of multipath information 618 (e.g., 732 in FIG. 7; 810 in FIG. 8; 902 in FIG. 9) may include a set of angle fields for an azimuthal angle and/or an elevational angle of the AoA(s) (e.g., 713 in FIG. 7; 906, 908 in FIG. 9) associated with the multipath signal(s) in the set of multipath signals 614 (e.g., 712 in FIG. 7). In aspects, one or more fields of the set of angle fields for the azimuthal angle and/or the elevational angle (e.g., 713 in FIG. 7; 906, 908 in FIG. 9) may include a respective set of integers associated with at least one of an angle value range or an angle decimal value range (e.g., 910, 912 in FIG. 9).

In aspects, the set of multipath signals 614 (e.g., 712 in FIG. 7) may include a first multipath signal and second multipath signal, where the first multipath signal is associated with a first AoA of the at least one AoA (e.g., 713 in FIG. 7; 906, 908 in FIG. 9) and the second multipath signal is associated with a second AoA of the at least one AoA. (e.g., 713 in FIG. 7; 906, 908 in FIG. 9) The first AoA is different from the second AoA, in aspects, and the respective set of integers for the second AOA may indicate a difference value from at least one of the angle value range or the angle decimal value range for the first AoA. Accordingly, an amount of data/information transmitted/provided for the indication of multipath information 618 (e.g., 732 in FIG. 7; 810 in FIG. 8; 902 in FIG. 9) may be reduced. The multipath information indicated by the indication of multipath information 618 (e.g., 732 in FIG. 7; 810 in FIG. 8; 902 in FIG. 9) may include a set of quality fields (e.g., 916, 918 in FIG. 9) for at least one quality estimate for the at least one AoA (e.g., 713 in FIG. 7; 906, 908 in FIG. 9) associated with the set of multipath signals 614 (e.g., 712 in FIG. 7). The set of quality fields (e.g., 916, 918 in FIG. 9) may include one or more angle fields corresponding to each multipath signal of the set of multipath signals 614 (e.g., 712 in FIG. 7), or may include one or more joint fields corresponding to associated pairs of AoAs and ToF values of the at least one AoA (e.g., 713 in FIG. 7; 906, 908 in FIG. 9) and the set of ToF values (e.g., 719 in FIG. 7).

In aspects, based on a reception of the location information request from the network entity 604, the UE 602 may be configured to transmit/provide the indication of multipath information 618 (e.g., 732 in FIG. 7; 810 in FIG. 8; 902 in FIG. 9) as a location information request response (e.g., 810 in FIG. 8) in a second IE and based on a threshold condition (e.g., at 808 in FIG. 8) associated with a RSRPP for each multipath signal in the set of multipath signals 614 (e.g., 712 in FIG. 7). In aspects, where an estimation (e.g., at 616) by the UE 602 is absent for an additional AoA (e.g., another of 713 in FIG. 7; another of 906, 908 in FIG. 9) associated with an additional multipath signal of the set of multipath signals 614 (e.g., 712 in FIG. 7), the UE 602 may be configured to include in the indication of multipath information 618 (e.g., 732 in FIG. 7; 810 in FIG. 8; 902 in FIG. 9) an indication (e.g., 906, 908 of 970 in FIG. 9), express or implicit, of the absence.

Figure 14:
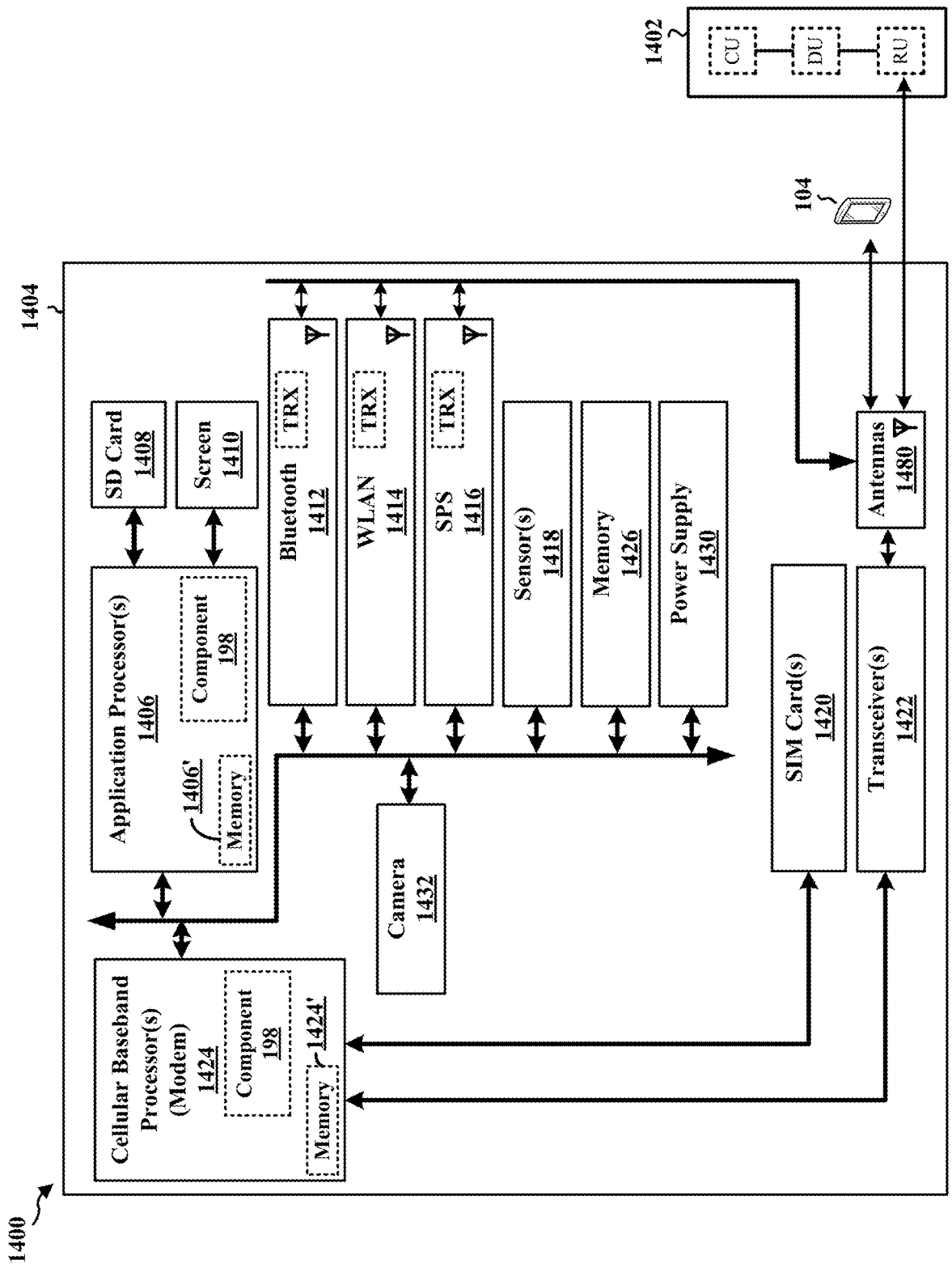
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) 1424 communicates through the transceiver(s) 1422 via one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The cellular baseband processor(s) 1424 and the application processor(s) 1406 are configured to perform the various functions described supra based at least in part of the information stored in the memory. That is, the cellular baseband processor(s) 1424 and the application processor(s) 1406 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1424/application processor(s) 1406 when executing software. The cellular baseband processor(s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the component 198 may be configured to receive a set of multipath signals for a set of VAs, where each VA in the set of VAs is associated with a corresponding reflecting surface in a communication environment of the UE, where reflection of the set of multipath signals occurs via the corresponding reflecting surface associated with each VA in the set of VAs. The component 198 may be configured to estimate at least one AoA associated with the set of multipath signals based on at least one of a set of ToF values associated with the set of multipath signals, a UE location, or a VA location. The component 198 may be configured to provide, to a network entity, an indication of multipath information associated with the set of multipath signals for the set of VAs, where the multipath information includes the at least one AoA associated with at least one multipath signal in the set of multipath signals. The component 198 may be configured to receive, from the network entity, a global coordinate system configuration associated with the global coordinate system, where the coordinate system indication is indicative of the global coordinate system. The component 198 may be configured to select the local coordinate system associated with the UE, where the coordinate system indication is indicative of the local coordinate system. The component 198 may be configured to provide, for the network entity, a capability indication that is indicative of a capability of the UE to support a number of per-path angles for the set of multipath signals for the set of VAs, where the capability indication includes an angle information reporting capability field having a maximum supported value for the number of per-path angles that are supported by the UE for the indication of the multipath information associated with the set of multipath signals for the set of VAs. The component 198 may be configured to receive, from the network entity, a capability request that is indicative of a provision for the capability indication. The component 198 may be configured to receive, from the network entity, a location information request in a first IE, where the location information request is indicative of an additional paths extension and a request for the provision of the multipath information associated with the set of multipath signals for the set of VAs. The component 198 may be further configured to perform any of the aspects described in connection with the flowcharts in any of FIGS. 10, 11, 12, 13 and/or any of the aspects performed by a UE for any of FIGS. 4-9. The component 198 may be within the cellular baseband processor(s) 1424, the application processor(s) 1406, or both the cellular baseband processor(s) 1424 and the application processor(s) 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor(s) 1406, may include means for receiving a set of multipath signals for a set of VAs, where each VA in the set of VAs is associated with a corresponding reflecting surface in a communication environment of the UE, where reflection of the set of multipath signals occurs via the corresponding reflecting surface associated with each VA in the set of VAs. In the configuration, the apparatus 1404, and in particular the cellular baseband processor(s) 1424 and/or the application processor(s) 1406, may include means for estimating at least one AoA associated with the set of multipath signals based on at least one of a set of ToF values associated with the set of multipath signals, a UE location, or a VA location. In the configuration, the apparatus 1404, and in particular the cellular baseband processor(s) 1424 and/or the application processor(s) 1406, may include means for providing, to a network entity, an indication of multipath information associated with the set of multipath signals for the set of VAs, where the multipath information includes the at least one AoA associated with at least one multipath signal in the set of multipath signals. In one configuration, the apparatus 1404, and in particular the cellular baseband processor(s) 1424 and/or the application processor(s) 1406, may include means for receiving, from the network entity, a global coordinate system configuration associated with the global coordinate system, where the coordinate system indication is indicative of the global coordinate system. In one configuration, the apparatus 1404, and in particular the cellular baseband processor(s) 1424 and/or the application processor(s) 1406, may include means for selecting the local coordinate system associated with the UE, where the coordinate system indication is indicative of the local coordinate system. In one configuration, the apparatus 1404, and in particular the cellular baseband processor(s) 1424 and/or the application processor(s) 1406, may include means for providing, for the network entity, a capability indication that is indicative of a capability of the UE to support a number of per-path angles for the set of multipath signals for the set of VAs, where the capability indication includes an angle information reporting capability field having a maximum supported value for the number of per-path angles that are supported by the UE for the indication of the multipath information associated with the set of multipath signals for the set of VAs. In one configuration, the apparatus 1404, and in particular the cellular baseband processor(s) 1424 and/or the application processor(s) 1406, may include means for receiving, from the network entity, a capability request that is indicative of a provision for the capability indication. In one configuration, the apparatus 1404, and in particular the cellular baseband processor(s) 1424 and/or the application processor(s) 1406, may include means for receiving, from the network entity, a location information request in a first IE, where the location information request is indicative of an additional paths extension and a request for the provision of the multipath information associated with the set of multipath signals for the set of VAs. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
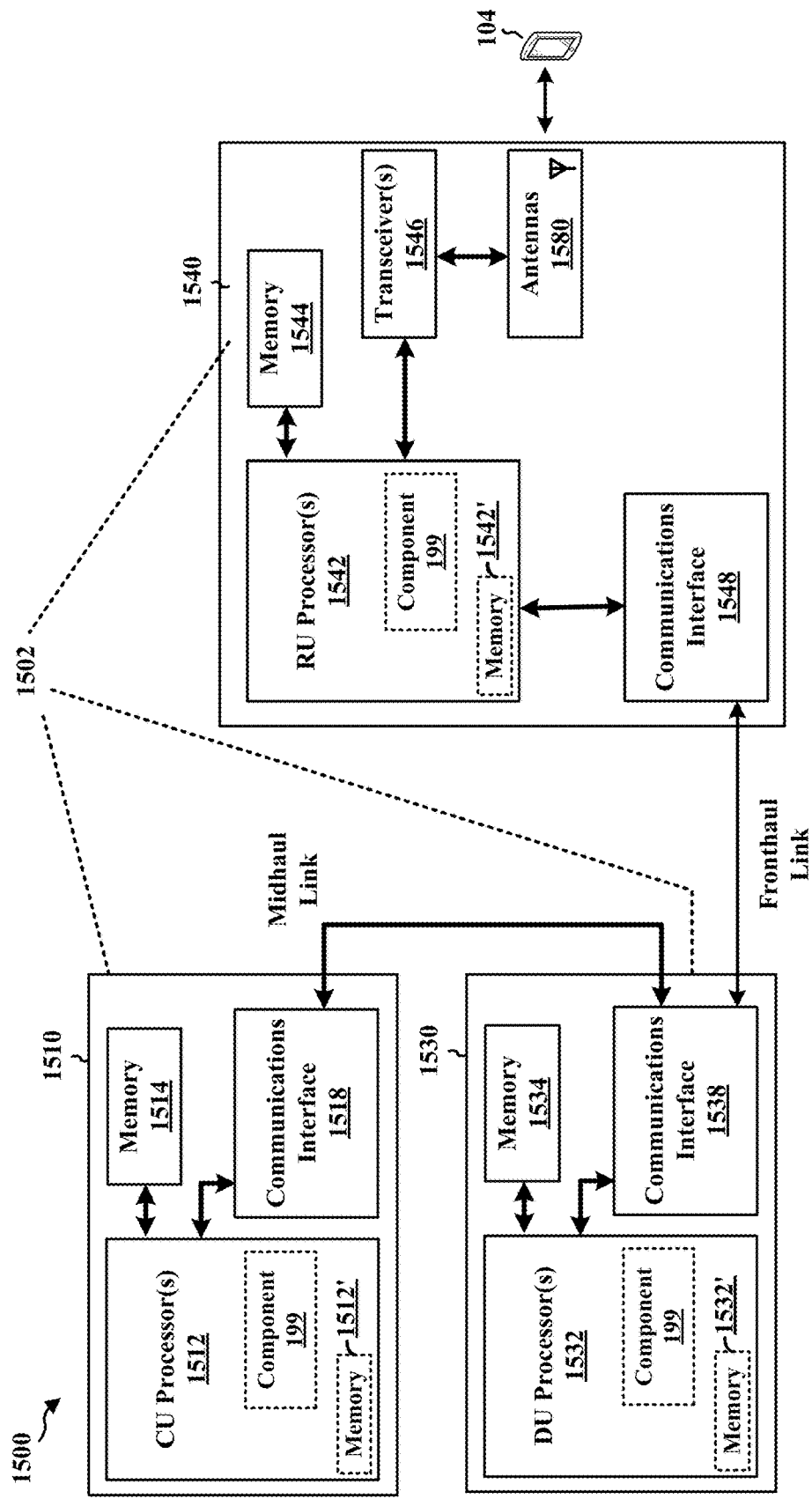
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include at least one CU processor 1512. The CU processor(s) 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include at least one DU processor 1532. The DU processor(s) 1532 may include on-chip memory 1532'. In some aspects, the DU 1530 may further include additional memory modules 1534 and a communications interface 1538. The DU 1530 communicates with the RU 1540 through a fronthaul link. The RU 1540 may include at least one RU processor 1542. The RU processor(s) 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to provide, for a UE, a signal via a communication channel. The component 199 may be configured to receive, from the UE, an indication of multipath information associated with a set of multipath signals, where the set of multipath signals corresponds to the signal provided via the communication channel and a set of VAs associated with a corresponding reflecting surface in a communication environment of the UE, where reflection of the set of multipath signals occurs via the corresponding reflecting surface associated with the set of VAs, where the multipath information includes at least one AoA that is associated with an estimation of at least one multipath signal in the set of multipath signals and that is associated with the at least one multipath signal in the set of multipath signals. The component 199 may be configured to provide, for the UE, a global coordinate system configuration associated with the global coordinate system, where the coordinate system indication is indicative of the global coordinate system. The component 199 may be configured to receive, from the UE, a capability indication that is indicative of a capability of the UE to support a number of per-path angles for the set of multipath signals, where the capability indication includes an angle information reporting capability field having a maximum supported value for the number of per-path angles that are supported by the UE for the indication of the multipath information associated with the set of multipath signals. The component 199 may be configured to provide, for the UE, a capability request that is indicative of the capability indication. The component 199 may be configured to provide, for the UE, a location information request in a first IE, where the location information request is indicative of an additional paths extension and a request for the provision of the multipath information associated with the set of multipath signals. The component 199 may be further configured to perform any of the aspects described in connection with the flowcharts in any of FIGS. 10, 11, 12, 13 and/or any of the aspects performed by a network entity (e.g., a TRP, a base station, a gNB, a network node, an LMF, a sensing server, etc.) for any of FIGS. 4-9. The component 199 may be within one or more processors of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1502 may include a variety of components configured for various functions. In one configuration, the network entity 1502 may include means for providing, for a UE, a signal via a communication channel. In the configuration, the network entity 1502 may include means for receiving, from the UE, an indication of multipath information associated with a set of multipath signals, where the set of multipath signals corresponds to the signal provided via the communication channel and a set of VAs associated with a corresponding reflecting surface in a communication environment of the UE, where reflection of the set of multipath signals occurs via the corresponding reflecting surface associated with the set of VAs, where the multipath information includes at least one AoA that is associated with an estimation of at least one multipath signal in the set of multipath signals and that is associated with the at least one multipath signal in the set of multipath signals. In one configuration, the network entity 1502 may include means for providing, for the UE, a global coordinate system configuration associated with the global coordinate system, where the coordinate system indication is indicative of the global coordinate system. In one configuration, the network entity 1502 may include means for receiving, from the UE, a capability indication that is indicative of a capability of the UE to support a number of per-path angles for the set of multipath signals, where the capability indication includes an angle information reporting capability field having a maximum supported value for the number of per-path angles that are supported by the UE for the indication of the multipath information associated with the set of multipath signals. In one configuration, the network entity 1502 may include means for providing, for the UE, a capability request that is indicative of the capability indication. In one configuration, the network entity 1502 may include means for providing, for the UE, a location information request in a first IE, where the location information request is indicative of an additional paths extension and a request for the provision of the multipath information associated with the set of multipath signals. The means may be the component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

Figure 16:
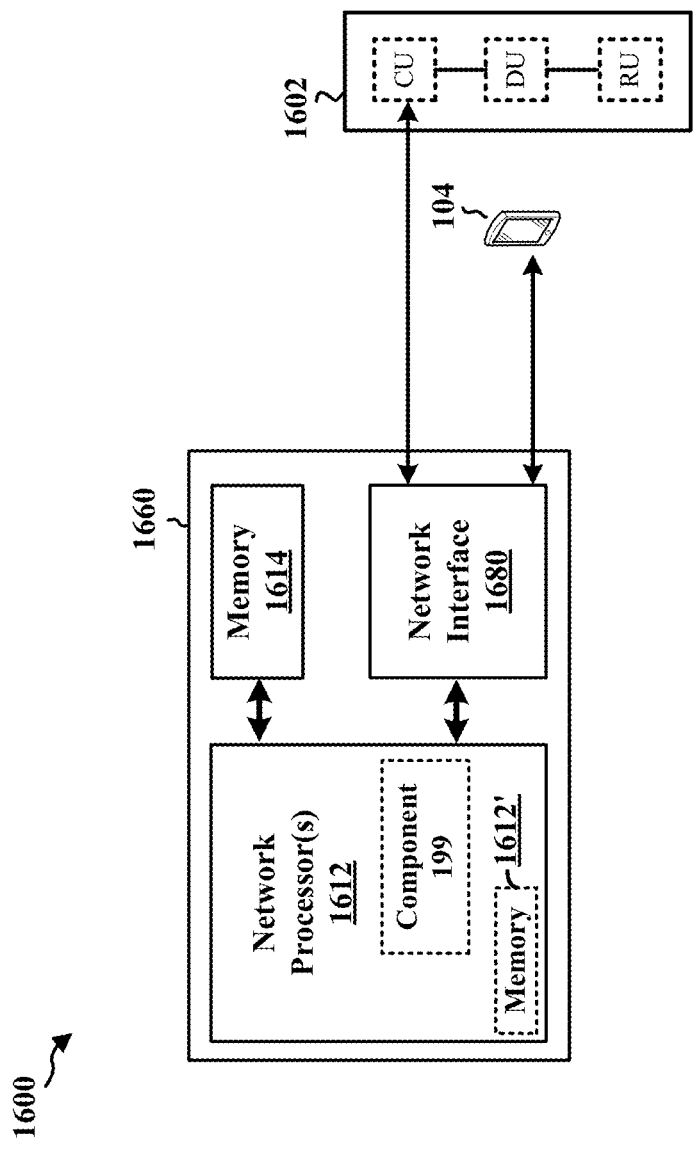
FIG. 16 is a diagram illustrating an example of a hardware implementation for an example network entity.

FIG. 16 is a diagram 1600 illustrating an example of a hardware implementation for a network entity 1660. In one example, the network entity 1660 may be within the core network 120. The network entity 1660 may include at least one network processor 1612. The network processor(s) 1612 may include on-chip memory 1612'. In some aspects, the network entity 1660 may further include additional memory modules 1614. The network entity 1660 communicates via the network interface 1680 directly (e.g., backhaul link) or indirectly (e.g., through a RIC) with the CU 1602. The on-chip memory 1612' and the additional memory modules 1614 may each be considered a computer-readable medium/memory. Each computer-readable medium/memory may be non-transitory. The network processor(s) 1612 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to provide, for a UE, a signal via a communication channel. The component 199 may be configured to receive, from the UE, an indication of multipath information associated with a set of multipath signals, where the set of multipath signals corresponds to the signal provided via the communication channel and a set of VAs associated with a corresponding reflecting surface in a communication environment of the UE, where reflection of the set of multipath signals occurs via the corresponding reflecting surface associated with the set of VAs, where the multipath information includes at least one AoA that is associated with an estimation of at least one multipath signal in the set of multipath signals and that is associated with the at least one multipath signal in the set of multipath signals. The component 199 may be configured to provide, for the UE, a global coordinate system configuration associated with the global coordinate system, where the coordinate system indication is indicative of the global coordinate system. The component 199 may be configured to receive, from the UE, a capability indication that is indicative of a capability of the UE to support a number of per-path angles for the set of multipath signals, where the capability indication includes an angle information reporting capability field having a maximum supported value for the number of per-path angles that are supported by the UE for the indication of the multipath information associated with the set of multipath signals. The component 199 may be configured to provide, for the UE, a capability request that is indicative of the capability indication. The component 199 may be configured to provide, for the UE, a location information request in a first IE, where the location information request is indicative of an additional paths extension and a request for the provision of the multipath information associated with the set of multipath signals. The component 199 may be further configured to perform any of the aspects described in connection with the flowcharts in any of FIGS. 10, 11, 12, 13 and/or any of the aspects performed by a network entity (e.g., a TRP, a base station, a gNB, a network node, an LMF, a sensing server, etc.) The component 199 may be within the network processor(s) 1612. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1660 may include a variety of components configured for various functions. In one configuration, the network entity 1660 may include means for providing, for a UE, a signal via a communication channel. In the configuration, the network entity 1660 may include means for receiving, from the UE, an indication of multipath information associated with a set of multipath signals, where the set of multipath signals corresponds to the signal provided via the communication channel and a set of VAs associated with a corresponding reflecting surface in a communication environment of the UE, where reflection of the set of multipath signals occurs via the corresponding reflecting surface associated with the set of VAs, where the multipath information includes at least one AoA that is associated with an estimation of at least one multipath signal in the set of multipath signals and that is associated with the at least one multipath signal in the set of multipath signals. In one configuration, the network entity 1660 may include means for providing, for the UE, a global coordinate system configuration associated with the global coordinate system, where the coordinate system indication is indicative of the global coordinate system. In one configuration, the network entity 1660 may include means for receiving, from the UE, a capability indication that is indicative of a capability of the UE to support a number of per-path angles for the set of multipath signals, where the capability indication includes an angle information reporting capability field having a maximum supported value for the number of per-path angles that are supported by the UE for the indication of the multipath information associated with the set of multipath signals. In one configuration, the network entity 1660 may include means for providing, for the UE, a capability request that is indicative of the capability indication. In one configuration, the network entity 1660 may include means for providing, for the UE, a location information request in a first IE, where the location information request is indicative of an additional paths extension and a request for the provision of the multipath information associated with the set of multipath signals. The means may be the component 199 of the network entity 1660 configured to perform the functions recited by the means.

Wireless communication networks may support communications between network nodes and UEs by which positioning for UEs may be determined for network entities. For example, in the context of enhanced positioning accuracy, a wireless communication network may enable a target device (e.g., a UE) to report its multipath information, indicated as NR-AdditionalPathList, with the three fields of nr-RelativeTimeDifference, nr-PathQuality, and nr-DL-PRS-RSRPP (reference signal received power per-path) for each additional path. In such configurations, improved positioning accuracy may be achieved. An AoA for each multipath may also be beneficial to positioning, sensing, and beam selection use cases. Further, reporting additional path phase measurements may also improve positioning, and AoAs for each path may additionally be estimated in multi-antenna receivers. However, the lack of reporting information per-path, and the corresponding mechanisms of angle measurement requests, reporting, and capability signaling, may prevent further improvements for positioning accuracy. Moreover, methods to estimate AoA for multi-antenna receivers are may include more complexity and/or cost.

The aspects described herein for multipath angle estimation and reporting for positioning enable a UE to receive a set of multipath signals, estimate associated AoAs based on a set of VAs, and report angle information on a per-path basis, in addition to values of other multipath signal characteristics. Aspects provide for a UE and a network entity to be configured to manage angle measurement requests, reporting, and capability signaling for multipath angle estimation and reporting for positioning. Aspects further provide for a UE to be configured to utilize various implementations and/or algorithms for estimating angles using VAs, where a UE may be configured to estimate AoAs without utilizing more than one antenna of a multi-antenna receivers, e.g., using one antenna. Aspects enable estimates of AoAs at a UE for multipath signals on a per-path basis by utilizing VAs. Aspects also enable improvements of UE positioning accuracy by configuring for and reporting angle information per path. Aspects further provide for estimates of AoAs at a UE for multipath signals on a per-path basis using one antenna at reduced complexity and cost by utilizing a set of ToF values associated with the set of multipath signals, a UE location, or a VA location.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: receiving a set of multipath signals for a set of virtual anchors (VAs), wherein each VA in the set of VAs is associated with a corresponding reflecting surface in a communication environment of the UE, wherein reflection of the set of multipath signals occurs via the corresponding reflecting surface associated with each VA in the set of VAs; estimating at least one angle of arrival (AoA) associated with the set of multipath signals based on at least one of a set of time of flight (ToF) values associated with the set of multipath signals, a UE location, or a VA location; and providing, to a network entity, an indication of multipath information associated with the set of multipath signals for the set of VAs, wherein the multipath information includes the at least one AoA associated with at least one multipath signal in the set of multipath signals.

Aspect 2 is the method of aspect 1, wherein providing the indication of the multipath information associated with the set of multipath signals for the set of VAs includes providing a coordinate system indication that is indicative of a local coordinate system associated with the UE or a global coordinate system, wherein the at least one AoA associated with the at least one multipath signal in the set of multipath signals is associated with coordinates that correspond to the coordinate system indication.

Aspect 3 is the method of aspect 2, further comprising at least one of: receiving, from the network entity, a global coordinate system configuration associated with the global coordinate system, wherein the coordinate system indication is indicative of the global coordinate system; or selecting the local coordinate system associated with the UE, wherein the coordinate system indication is indicative of the local coordinate system.

Aspect 4 is the method of any of aspects 1 to 3, wherein the multipath information includes a set of angle fields for at least one of an azimuthal angle or an elevational angle of the at least one AoA associated with the at least one multipath signal in the set of multipath signals; wherein one or more fields of the set of angle fields for at least one of the azimuthal angle or the elevational angle includes a respective set of integers associated with at least one of an angle value range or an angle decimal value range.

Aspect 5 is the method of aspect 4, wherein the set of multipath signals includes a first multipath signal and second multipath signal, wherein the first multipath signal is associated with a first AoA of the at least one AoA and the second multipath signal is associated with a second AoA of the at least one AoA, wherein the first AoA is different from the second AoA, and wherein the respective set of integers for the second AOA indicates a difference value from at least one of the angle value range or the angle decimal value range for the first AoA.

Aspect 6 is the method of any of aspects 1 to 5, wherein the multipath information includes a set of quality fields for at least one quality estimate for the at least one AoA associated with the set of multipath signals, wherein the set of quality fields includes one or more angle fields corresponding to each multipath signal of the set of multipath signals or includes one or more joint fields corresponding to associated pairs of AoAs and ToF values of the at least one AoA and the set of ToF values.

Aspect 7 is the method of any of aspects 1 to 6, further comprising: providing, for the network entity, a capability indication that is indicative of a capability of the UE to support a number of per-path angles for the set of multipath signals for the set of VAs, wherein the capability indication includes an angle information reporting capability field having a maximum supported value for the number of per-path angles that are supported by the UE for the indication of the multipath information associated with the set of multipath signals for the set of VAs.

Aspect 8 is the method of aspect 7, further comprising: receiving, from the network entity, a capability request that is indicative of a provision for the capability indication; wherein providing the capability indication includes providing the capability indication based on the capability request.

Aspect 9 is the method of any of aspects 1 to 8, further comprising: receiving, from the network entity, a location information request in a first information element (IE), wherein the location information request is indicative of an additional paths extension and a request for the provision of the multipath information associated with the set of multipath signals for the set of VAs; wherein providing the indication of the multipath information associated with the set of multipath signals for the set of VAs includes providing the indication of the multipath information as a location information request response in a second IE and based on a threshold condition associated with a reference signal received path power (RSRPP) for each multipath signal in the set of multipath signals.

Aspect 10 is the method of aspect 9, wherein an additional estimation by the UE is absent for an additional AoA associated with an additional multipath signal of the set of multipath signals; and wherein the indication of the multipath information associated with the set of multipath signals for the set of VAs is indicative of at least one of the absence for the additional AoA associated with the additional multipath signal or a reason for the absence, or wherein the indication of the multipath information associated with the set of multipath signals for the set of VAs excludes additional multipath information associated with the additional AoA associated with the additional multipath signal.

Aspect 11 is the method of any of aspects 1 to 10, wherein estimating the at least one AoA associated with the set of multipath signals comprises: obtaining the set of ToF values associated with the set of multipath signals based on at least one of the UE location or the VA location.

Aspect 12 is the method of aspect 11, wherein obtaining the set of ToF values associated with the set of multipath signals comprises: obtaining or training an observation model associated with the set of VAs based on at least one of the UE location or the VA location; and obtaining the set of ToF values associated with the set of multipath signals based on the observation model associated with the set of VAs.

Aspect 13 is the method of any of aspects 1 to 12, wherein receiving the set of multipath signals includes receiving the set of multipath signals via at least one antenna; wherein estimating the at least one AoA associated with the set of multipath signals includes estimating the at least one AoA associated with the set of multipath signals received via the at least one antenna.

Aspect 14 is the method of any of aspects 1 to 13, wherein the network entity is at least one of a location management function (LMF), a network node, or a sensing entity.

Aspect 15 is a method of wireless communication at a network entity, comprising: providing, for a user equipment (UE), a signal via a communication channel; and receiving, from the UE, an indication of multipath information associated with a set of multipath signals, wherein the set of multipath signals corresponds to the signal provided via the communication channel and a set of virtual anchors (VAs) associated with a corresponding reflecting surface in a communication environment of the UE, wherein reflection of the set of multipath signals occurs via the corresponding reflecting surface associated with the set of VAs, wherein the multipath information includes at least one angle of arrival (AoA) that is associated with an estimation of at least one multipath signal in the set of multipath signals and that is associated with the at least one multipath signal in the set of multipath signals.

Aspect 16 is the method of aspect 15, wherein receiving the indication of the multipath information associated with the set of multipath signals includes receiving a coordinate system indication that is indicative of a local coordinate system associated with the UE or a global coordinate system, wherein the at least one AoA associated with the at least one multipath signal in the set of multipath signals is associated with coordinates that correspond to the coordinate system indication.

Aspect 17 is the method of aspect 16, further comprising: providing, for the UE, a global coordinate system configuration associated with the global coordinate system, wherein the coordinate system indication is indicative of the global coordinate system.

Aspect 18 is the method of any of aspects 15 to 17, wherein the multipath information includes a set of angle fields for at least one of an azimuthal angle or an elevational angle of the at least one AoA associated with the at least one multipath signal in the set of multipath signals; wherein one or more fields of the set of angle fields for at least one of the azimuthal angle or the elevational angle includes a respective set of integers associated with at least one of an angle value range or an angle decimal value range.

Aspect 19 is the method of aspect 18, wherein the set of multipath signals includes a first multipath signal and second multipath signal, wherein the first multipath signal is associated with a first AoA of the at least one AoA and the second multipath signal is associated with a second AoA of the at least one AoA, wherein the first AoA is different from the second AoA, wherein the respective set of integers for the second AOA indicates a difference value from at least one of the angle value range or the angle decimal value range for the first AoA.

Aspect 20 is the method of any of aspects 15 to 19, wherein the multipath information includes a set of quality fields for at least one quality estimate for the at least one AoA associated with the set of multipath signals, wherein the set of quality fields includes one or more angle fields corresponding to each multipath signal of the set of multipath signals or includes one or more joint fields corresponding to associated pairs of AoAs and time of flight (ToF) values of the at least one AoA and a set of ToF values.

Aspect 21 is the method of any of aspects 15 to 20, further comprising: receiving, from the UE, a capability indication that is indicative of a capability of the UE to support a number of per-path angles for the set of multipath signals, wherein the capability indication includes an angle information reporting capability field having a maximum supported value for the number of per-path angles that are supported by the UE for the indication of the multipath information associated with the set of multipath signals.

Aspect 22 is the method of claim 21, further comprising: providing, for the UE, a capability request that is indicative of the capability indication; wherein receiving the capability indication includes receiving the capability indication based on the capability request.

Aspect 23 is the method of any of aspects 15 to 22, further comprising: providing, for the UE, a location information request in a first information element (IE), wherein the location information request is indicative of an additional paths extension and a request for a provision of the multipath information associated with the set of multipath signals; wherein receiving the indication of the multipath information associated with the set of multipath signals includes receiving the indication of the multipath information as a location information request response in a second IE and based on a threshold condition associated with a reference signal received path power (RSRPP) for each multipath signal in the set of multipath signals.

Aspect 24 is the method of aspect 23, wherein an additional estimation is absent for an additional AoA associated with an additional multipath signal of the set of multipath signals; and wherein the indication of the multipath information associated with the set of multipath signals is indicative of at least one of the absence for the additional AoA associated with the additional multipath signal or a reason for the absence, or wherein the indication of the multipath information associated with the set of multipath signals excludes additional multipath information associated with the additional AoA associated with the additional multipath signal.

Aspect 25 is the method of any of aspects 15 to 24, wherein the estimation of the at least one multipath signal in the set of multipath signals is based on a set of ToF values associated with the set of multipath signals and at least one of a UE location or a VA location.

Aspect 26 is the method of aspect 25, wherein the set of ToF values associated with the set of multipath signals is based on an obtainment or a training of an observation model associated with the set of VAs based on at least one of the UE location or the VA location.

Aspect 27 is the method of any of aspects 15 to 26, wherein receiving the set of multipath signals includes receiving the set of multipath signals via at least one antenna; wherein estimating the at least one AoA associated with the set of multipath signals includes estimating the at least one AoA associated with the set of multipath signals received via the at least one antenna.

Aspect 28 is the method of any of aspects 15 to 27, wherein the network entity is at least one of a location management function (LMF), a network node, or a sensing entity.

Aspect 29 is an apparatus for wireless communication at a user equipment (UE), comprising: at least one memory; and at least one processor coupled to the at least one memory, the at least one processor, individually or in any combination, is configured to perform the method of any of aspects 1 to 14.

Aspect 30 is an apparatus for wireless communication at a user equipment (UE), comprising means for performing each step in the method of any of aspects 1 to 14.

Aspect 31 is the apparatus of any of aspects 29 and 30, further comprising a transceiver configured to receive or to transmit in association with the method of any of aspects 1 to 14.

Aspect 32 is a computer-readable medium (e.g., a non-transitory computer-readable medium) storing computer executable code at a user equipment (UE), the code when executed by at least one processor causes the at least one processor to perform the method of any of aspects 1 to 14.

Aspect 33 is an apparatus for wireless communication at a network entity, comprising: at least one memory; and at least one processor coupled to the at least one memory, the at least one processor, individually or in any combination, is configured to perform the method of any of aspects 15 to 28.

Aspect 34 is an apparatus for wireless communication at a network entity, comprising means for performing each step in the method of any of aspects 15 to 28.

Aspect 35 is the apparatus of any of aspects 33 and 34, further comprising a transceiver configured to receive or to transmit in association with the method of any of aspects 15 to 28.

Aspect 36 is a computer-readable medium (e.g., a non-transitory computer-readable medium) storing computer executable code at a network entity, the code when executed by at least one processor causes the at least one processor to perform the method of any of aspects 15 to 28.

What is claimed is:

1. An apparatus for wireless communication at a user equipment (UE), comprising:
at least one memory; and
at least one processor coupled to the at least one memory and, based at least in part on information stored in the at least one memory, the at least one processor, individually or in any combination, is configured to:
receive a set of multipath signals for a set of virtual anchors (VAs), wherein each VA in the set of VAs is associated with a corresponding reflecting surface in a communication environment of the UE, wherein reflection of the set of multipath signals occurs via the corresponding reflecting surface associated with each VA in the set of VAs;
estimate at least one angle of arrival (AoA) associated with the set of multipath signals based on at least one of a set of time of flight (ToF) values associated with the set of multipath signals, a UE location, or a VA location; and
provide, to a network entity, an indication of multipath information associated with the set of multipath signals for the set of VAs, wherein the multipath information includes the at least one AoA associated with at least one multipath signal in the set of multipath signals.

2. The apparatus of claim 1, wherein to provide the indication of the multipath information associated with the set of multipath signals for the set of VAs, the at least one processor, individually or in any combination, is configured to provide a coordinate system indication that is indicative of a local coordinate system associated with the UE or a global coordinate system, wherein the at least one AoA associated with the at least one multipath signal in the set of multipath signals is associated with coordinates that correspond to the coordinate system indication.

3. The apparatus of claim 2, wherein the at least one processor, individually or in any combination, is further configured to:
receive, from the network entity, a global coordinate system configuration associated with the global coordinate system, wherein the coordinate system indication is indicative of the global coordinate system; or
select the local coordinate system associated with the UE, wherein the coordinate system indication is indicative of the local coordinate system.

4. The apparatus of claim 1, wherein the multipath information includes a set of angle fields for at least one of an azimuthal angle or an elevational angle of the at least one AoA associated with the at least one multipath signal in the set of multipath signals;
wherein one or more fields of the set of angle fields for at least one of the azimuthal angle or the elevational angle includes a respective set of integers associated with at least one of an angle value range or an angle decimal value range.

5. The apparatus of claim 4, wherein the set of multipath signals includes a first multipath signal and second multipath signal, wherein the first multipath signal is associated with a first AoA of the at least one AoA and the second multipath signal is associated with a second AoA of the at least one AoA, wherein the first AoA is different from the second AoA, and wherein the respective set of integers for the second AOA indicates a difference value from at least one of the angle value range or the angle decimal value range for the first AoA.

6. The apparatus of claim 1, wherein the multipath information includes a set of quality fields for at least one quality estimate for the at least one AoA associated with the set of multipath signals, wherein the set of quality fields includes one or more angle fields corresponding to each multipath signal of the set of multipath signals or includes one or more joint fields corresponding to associated pairs of AoAs and ToF values of the at least one AoA and the set of ToF values.

7. The apparatus of claim 1, wherein the at least one processor, individually or in any combination, is further configured to:
provide, for the network entity, a capability indication that is indicative of a capability of the UE to support a number of per-path angles for the set of multipath signals for the set of VAs, wherein the capability indication includes an angle information reporting capability field having a maximum supported value for the number of per-path angles that are supported by the UE for the indication of the multipath information associated with the set of multipath signals for the set of VAs.

8. The apparatus of claim 7, wherein the at least one processor, individually or in any combination, is further configured to:
receive, from the network entity, a capability request that is indicative of a provision for the capability indication;
wherein to provide the capability indication, the at least one processor, individually or in any combination, is configured to provide the capability indication based on the capability request.

9. The apparatus of claim 1, further comprising at least one transceiver coupled to the at least one processor, wherein the at least one processor, individually or in any combination, is further configured to:
receive, from the network entity via the at least one transceiver, a location information request in a first information element (IE), wherein the location information request is indicative of an additional paths extension and a request for the provision of the multipath information associated with the set of multipath signals for the set of VAs;
wherein to provide the indication of the multipath information associated with the set of multipath signals for the set of VAs, the at least one processor, individually or in any combination, is configured to provide the indication of the multipath information as a location information request response in a second IE and based on a threshold condition associated with a reference signal received path power (RSRPP) for each multipath signal in the set of multipath signals.

10. The apparatus of claim 9, wherein an additional estimation by the UE is absent for an additional AoA associated with an additional multipath signal of the set of multipath signals; and
wherein the indication of the multipath information associated with the set of multipath signals for the set of VAs is indicative of at least one of the absence for the additional AoA associated with the additional multipath signal or a reason for the absence, or
wherein the indication of the multipath information associated with the set of multipath signals for the set of VAs excludes additional multipath information associated with the additional AoA associated with the additional multipath signal.

11. The apparatus of claim 1, wherein to estimate the at least one AoA associated with the set of multipath signals, the at least one processor, individually or in any combination, is configured to:
obtain the set of ToF values associated with the set of multipath signals based on at least one of the UE location or the VA location.

12. The apparatus of claim 11, wherein to obtain the set of ToF values associated with the set of multipath signals, the at least one processor, individually or in any combination, is configured to:
obtain or train an observation model associated with the set of VAs based on at least one of the UE location or the VA location; and
obtain the set of ToF values associated with the set of multipath signals based on the observation model associated with the set of VAs.

13. The apparatus of claim 1, wherein to receive the set of multipath signals, the at least one processor, individually or in any combination, is configured to receive the set of multipath signals via at least one antenna;
wherein to estimate the at least one AoA associated with the set of multipath signals, the at least one processor, individually or in any combination, is configured to estimate the at least one AoA associated with the set of multipath signals received via the at least one antenna.

14. The apparatus of claim 1, wherein the network entity is at least one of a location management function (LMF), a network node, or a sensing entity.

15. An apparatus for wireless communication at a network entity, comprising:
at least one memory; and
at least one processor coupled to the at least one memory and, based at least in part on information stored in the at least one memory, the at least one processor, individually or in any combination, is configured to:
provide, for a user equipment (UE), a signal via a communication channel; and
receive, from the UE, an indication of multipath information associated with a set of multipath signals, wherein the set of multipath signals corresponds to the signal provided via the communication channel and a set of virtual anchors (VAs) associated with a corresponding reflecting surface in a communication environment of the UE, wherein reflection of the set of multipath signals occurs via the corresponding reflecting surface associated with the set of VAs, wherein the multipath information includes at least one angle of arrival (AoA) that is associated with an estimation of at least one multipath signal in the set of multipath signals and that is associated with the at least one multipath signal in the set of multipath signals.

16. The apparatus of claim 15, wherein to receive the indication of the multipath information associated with the set of multipath signals, the at least one processor, individually or in any combination, is configured to receive a coordinate system indication that is indicative of a local coordinate system associated with the UE or a global coordinate system, wherein the at least one AoA associated with the at least one multipath signal in the set of multipath signals is associated with coordinates that correspond to the coordinate system indication.

17. The apparatus of claim 16, wherein the at least one processor, individually or in any combination, is further configured to:
provide, for the UE, a global coordinate system configuration associated with the global coordinate system, wherein the coordinate system indication is indicative of the global coordinate system.

18. The apparatus of claim 15, wherein the multipath information includes a set of angle fields for at least one of an azimuthal angle or an elevational angle of the at least one AoA associated with the at least one multipath signal in the set of multipath signals;
wherein one or more fields of the set of angle fields for at least one of the azimuthal angle or the elevational angle includes a respective set of integers associated with at least one of an angle value range or an angle decimal value range.

19. The apparatus of claim 18, wherein the set of multipath signals includes a first multipath signal and second multipath signal, wherein the first multipath signal is associated with a first AoA of the at least one AoA and the second multipath signal is associated with a second AoA of the at least one AoA, wherein the first AoA is different from the second AoA, wherein the respective set of integers for the second AOA indicates a difference value from at least one of the angle value range or the angle decimal value range for the first AoA.

20. The apparatus of claim 15, wherein the multipath information includes a set of quality fields for at least one quality estimate for the at least one AoA associated with the set of multipath signals, wherein the set of quality fields includes one or more angle fields corresponding to each multipath signal of the set of multipath signals or includes one or more joint fields corresponding to associated pairs of AoAs and time of flight (ToF) values of the at least one AoA and a set of ToF values.

21. The apparatus of claim 15, wherein the at least one processor, individually or in any combination, is further configured to:
receive, from the UE, a capability indication that is indicative of a capability of the UE to support a number of per-path angles for the set of multipath signals, wherein the capability indication includes an angle information reporting capability field having a maximum supported value for the number of per-path angles that are supported by the UE for the indication of the multipath information associated with the set of multipath signals.

22. The apparatus of claim 21, wherein the at least one processor, individually or in any combination, is further configured to:
provide, for the UE, a capability request that is indicative of the capability indication;
wherein to receive the capability indication, the at least one processor, individually or in any combination, is configured to receive the capability indication based on the capability request.

23. The apparatus of claim 15, further comprising at least one transceiver coupled to the at least one processor, wherein the at least one processor, individually or in any combination, is further configured to:
provide, for the UE via the at least one transceiver, a location information request in a first information element (IE), wherein the location information request is indicative of an additional paths extension and a request for a provision of the multipath information associated with the set of multipath signals;
wherein to receive the indication of the multipath information associated with the set of multipath signals, the at least one processor, individually or in any combination, is configured to receive the indication of the multipath information as a location information request response in a second IE and based on a threshold condition associated with a reference signal received path power (RSRPP) for each multipath signal in the set of multipath signals.

24. The apparatus of claim 23, wherein an additional estimation is absent for an additional AoA associated with an additional multipath signal of the set of multipath signals; and
wherein the indication of the multipath information associated with the set of multipath signals is indicative of at least one of the absence for the additional AoA associated with the additional multipath signal or a reason for the absence, or wherein the indication of the multipath information associated with the set of multipath signals excludes additional multipath information associated with the additional AoA associated with the additional multipath signal.

25. The apparatus of claim 15, wherein the estimation of the at least one multipath signal in the set of multipath signals is based on a set of ToF values associated with the set of multipath signals and at least one of a UE location or a VA location.

26. The apparatus of claim 25, wherein the set of ToF values associated with the set of multipath signals is based on an obtainment or a training of an observation model associated with the set of VAs based on at least one of the UE location or the VA location.

27. The apparatus of claim 15, wherein to receive the set of multipath signals, the at least one processor, individually or in any combination, is configured to receive the set of multipath signals via at least one antenna;
wherein to estimate the at least one AoA associated with the set of multipath signals, the at least one processor, individually or in any combination, is configured to estimate the at least one AoA associated with the set of multipath signals received via the at least one antenna.

28. The apparatus of claim 15, wherein the network entity is at least one of a location management function (LMF), a network node, or a sensing entity.

29. A method of wireless communication at a user equipment (UE), comprising:
- receiving a set of multipath signals for a set of virtual anchors (VAs), wherein each VA in the set of VAs is associated with a corresponding reflecting surface in a communication environment of the UE, wherein reflection of the set of multipath signals occurs via the corresponding reflecting surface associated with each VA in the set of VAs;
- estimating at least one angle of arrival (AoA) associated with the set of multipath signals based on at least one of a set of time of flight (ToF) values associated with the set of multipath signals, a UE location, or a VA location; and
- providing, to a network entity, an indication of multipath information associated with the set of multipath signals for the set of VAs, wherein the multipath information includes the at least one AoA associated with at least one multipath signal in the set of multipath signals.

30. A method of wireless communication at a network entity, comprising:
- providing, for a user equipment (UE), a signal via a communication channel; and
- receiving, from the UE, an indication of multipath information associated with a set of multipath signals, wherein the set of multipath signals corresponds to the signal provided via the communication channel and a set of virtual anchors (VAs) associated with a corresponding reflecting surface in a communication environment of the UE, wherein reflection of the set of multipath signals occurs via the corresponding reflecting surface associated with the set of VAs, wherein the multipath information includes at least one angle of arrival (AoA) that is associated with an estimation of at least one multipath signal in the set of multipath signals and that is associated with the at least one multipath signal in the set of multipath signals.

* * * * *